United States Patent [19]

Sakaue et al.

[11] Patent Number: 5,745,467
[45] Date of Patent: Apr. 28, 1998

[54] OPTICAL INFORMATION RECORDING METHOD AND APPARATUS

[75] Inventors: Yoshitaka Sakaue, Hirakata; Kenichi Nishiuchi, Moriguchi; Eiji Ohno, Hirakata, all of Japan

[73] Assignee: Matsushita Electric Industrial Co., Ltd., Osaka, Japan

[21] Appl. No.: 725,944

[22] Filed: Oct. 8, 1996

[30] Foreign Application Priority Data

| Oct. 9, 1995 | [JP] | Japan | 7-261246 |
| Oct. 9, 1995 | [JP] | Japan | 7-261262 |
| Jul. 25, 1996 | [JP] | Japan | 8-195880 |

[51] Int. Cl.$^6$ ............ G11B 7/00
[52] U.S. Cl. ............ 369/116; 369/59; 369/107; 369/124
[58] Field of Search ............ 369/116, 59, 107, 369/124, 54

[56] References Cited

U.S. PATENT DOCUMENTS

| 5,257,256 | 10/1993 | Terao et al. | 369/116 |
| 5,396,480 | 3/1995 | Morishita et al. | 369/116 |
| 5,430,696 | 7/1995 | Tokita et al. | 369/116 |
| 5,490,126 | 2/1996 | Furumiya et al. | 369/59 |
| 5,581,535 | 12/1996 | Saito et al. | 369/116 |
| 5,608,710 | 3/1997 | Minemura et al. | 369/116 |

FOREIGN PATENT DOCUMENTS

| 63-113938 | 5/1988 | Japan. |
| 3-185628 | 8/1991 | Japan. |
| 6-295440 | 10/1994 | Japan. |
| 7-129959 | 5/1995 | Japan. |

Primary Examiner—David C. Nelms
Assistant Examiner—Kim-Kwok Chu
Attorney, Agent, or Firm—Ratner & Prestia

[57] ABSTRACT

In mark length modulation recording, a mark end portion correction pulse train is added to a recording pulse train, or laser radiation with bias power is applied between the recording pulse train and laser radiation with cooling power or the mark end portion correction pulse train, furthermore, the start time of the cooling power radiation, the duration of the cooling power radiation, and the shape of the mark end portion correction pulse train are varied in accordance with the mark length to be recorded, further, in CAV mode, the start time of the cooling power radiation or the duration of the cooling power radiation is varied in accordance with disk radius position, and when the recording pulse train consists of a start pulse, an end pulse, and pulses between the start and end pulses, laser radiation with cooling power is applied, or laser radiation with bias power is applied between the recording pulse train and cooling power application, and when the recording pulse train is varied in accordance with mark length and mark spacing, the timing to start the laser radiation with cooling power is delayed by a predetermined amount from the end pulse or determined based on the clock.

36 Claims, 14 Drawing Sheets

INPUT
WAVEFORM B

RECORDING
WAVEFORM H

RECORDING
WAVEFORM I

RECORDING
WAVEFORM J

INPUT
WAVEFORM A

RECORDING
WAVEFORM E
    RECORDING
    POWER LEVEL
  BIAS POWER LEVEL

RECORDING
WAVEFORM F
    RECORDING
    POWER LEVEL
  BIAS POWER LEVEL
    COOLING
    POWER LEVEL

RECORDING
WAVEFORM G
    RECORDING
    POWER LEVEL
  BIAS POWER LEVEL
    COOLING
    POWER LEVEL

RECORDING WAVEFORM 11-1

RECORDING WAVEFORM 11-2

RECORDING WAVEFORM 11-3

RECORDING WAVEFORM 11-4

RECORDING WAVEFORM 11-5

RECORDING WAVEFORM 11-6

RECORDING WAVEFORM 11-7

RECORDING
WAVEFORM 17-1

RECORDING
WAVEFORM 17-2

INNER RADIUS

INTERMEDIATE
RADIUS

OUTER RADIUS

OPTICAL INFORMATION RECORDING METHOD AND APPARATUS

BACKGROUND OF THE INVENTION

1. Field of the Invention

The present invention relates to an optical disk recording method and apparatus for recording and playing back information at high speed and high density using optical means such as laser light or the like.

2. Description of the Related Art

Technologies for playing back or recording high-density information using laser light are well known, and are commercially implemented mainly as optical disks.

Optical disks can be classified into three main types: read-only type, write-once type, and rewritable type.

The read-only type has found practical application, for example, as compact discs and laser discs, and the write-once type and the rewritable type as disks for storing document files, data files, etc.

Rewritable optical disks are mainly implemented by magneto-optical recording and phase-change optical recording.

Phase-change optical disks use a recording layer which, when illuminated with laser light, exhibits a reversible state change between amorphous and crystalline or between one crystalline structure and another crystalline structure. More specifically, when illuminated with laser light, either the refractive index or extinction coefficient of the thin film or both vary, thus accomplishing recording. Since the amplitude of transmitted light or reflected light changes at this recorded portion, the recorded signal is read by detecting the change in the amount of the transmitted light or reflected light reaching the detection system. Representative examples of materials used that exhibit a state change between amorphous and crystalline include alloys of tellurium, selenium, indium, antimony, etc.

Further, phase-change optical disks can use a one-beam overwrite method to rewrite recorded marks. The one-beam overwrite method is a method that records a new signal while erasing the already recorded old signal, by modulating laser power with a recording signal between a recording power and a bias power (also called an erasing power) lower than the recording power and by shining the thus modulated laser onto the signal track. Overwrite itself requires two power levels, the recording power level and the bias power level, but when recording, erasure, and reading are considered, three power levels are required, that is, the recording power level, the bias power level, and the read power level.

For example, in a crystalline/amorphous phase-change optical disk, an area illuminated with the recording power level, whether its original state was amorphous or crystalline, becomes amorphous since it is rapidly cooled after melting, and an area illuminated with the erasing power level is crystallized regardless of its original state, since it is heated above its crystallizing temperature. A new signal is thus written over the old signal.

On the other hand, for optical disk recording/reading apparatus, there are two main methods of disk rotation. One is a constant linear velocity (CLV) method in which the disk is rotated with the same linear velocity, whether at the inner circumference or the outer circumference of the disk, and the other is a constant angular velocity (CAV) method in which the disk is rotated with a constant angular velocity.

For example, for applications such as data file disks, etc. used as computer external storage media where high-speed access is required, CAV is used since varying the disk's rotational speed takes time. In this case, the linear velocity along the circumference of the disk increases toward the outer circumference and decreases toward the inner circumference.

Further, there are two recording modulation methods, mark spacing (also called mark position) modulation and mark length (also called mark edge) modulation.

In mark spacing modulation recording, a signal is recorded by varying mark spacing, and when playing back, the signal is read by detecting mark positions.

In mark length modulation recording, marks of various lengths are recorded with various mark spacings, and when playing back, the recorded signal is read by detecting both edges of each mark. Theoretically, the mark length modulation method can achieve recording at a density twice what is possible with the mark spacing modulation method.

Basically, laser recording on a phase-change optical disk is achieved by a heat mode; therefore, when a long mark is recorded, the end portion of the mark becomes wider than the start portion of the mark because of heat accumulation, distorting the mark in a teardrop shape and resulting in a distorted read waveform with both ends of the mark displaced in position.

To avoid this, in the mark length modulation method, there is proposed a recording method (for example, in Japanese Patent Laid Open Publication No. 3-185628) in which a recording waveform for forming a recorded mark is constructed with a recording pulse train consisting of a plurality of pulses (this recording method is also called multipulse recording). This method, compared with a single pulse recording method, can control the heat applied to the recording film and can produce a mark with a good shape without the mark shape becoming asymmetrical between its start and end portions as has been the case with the single pulse method.

However, even with the multipulse recording method, if mark spacing is reduced to meet a demand for higher density, heat interference occurs between marks, causing a change in mark length and mark shape.

A method aimed at solving this problem is proposed, for example, in Japanese Patent Laid Open Publication No. 7-129959. In the proposed method, the amount of heat interference is predicted, and when performing multipulse recording, the start and end positions of a recording pulse train are changed according to recorded mark length and mark spacing, to suppress heat interference between marks and thereby improve signal characteristics.

There is also proposed a recording method (for example, in Japanese Patent Laid Open Publication No. 63-113938) in which, in performing one-beam overwrite, recording pulses are modulated in three levels between the recording power, the bias power, and a power immediately following the recording power and set lower than the bias power.

Furthermore, a recording method is proposed (for example, in Japanese Patent Laid Open Publication No. 6-295440) that performs laser radiation with a power lower than the bias power when recording by the multipulse recording method.

Moreover, a method is proposed (in Japanese Application No. 5-80491) in which the duration of cooling power radiation (hereinafter referred to as the cooling power radiation time) is varied according to mark spacing.

When recording a signal on an optical disk such as a rewritable phase-change optical disk by focusing light from a light source, such as a semiconductor laser, and thereby causing a physical state change for recording, the temperature of the recording layer reaches several hundred degrees centigrade because of the heat generated by the light from the light source, and the thin recording film is melted.

Accordingly, by performing erase-rewrite operations many times, that is, by repeating the overwrite cycle many times, signal degradation occurs because of thermal damage.

Signal degradation is caused by destruction of the dielectric layer and recording layer and also by a phenomenon called material flow in the recording layer. Material flow is a phenomenon in which the recording layer material moves in the track direction as the overwrite cycle is repeated since the recording layer and its adjacent areas are heated to high temperatures during recording, resulting in the formation of portions where the recording film is thin and portions where the recording film is thick on the same track. As a result, when the recorded signal is played back, the read waveform is corrupted and the signal cannot be played back from the affected portion. In any case, if signal degradation due to repeated overwrite cycles is large, the potential application of the optical disk is limited.

Further, when causing a physical state change by applying light using a semiconductor laser in an optical disk apparatus, for example, when recording a signal on an optical disk fabricated with rewritable phase-change materials, the recorded mark shape varies depending on the way that the recording layer heated by the laser light cools.

That is, if a situation such as heat trapping occurs, the recording layer once melted becomes crystallized instead of becoming amorphous. As a result, the recorded mark is reduced in size or distorted in shape, causing degradation in read signal quality.

When a cooling pulse as used in the prior art is employed, the degree of heat trapping at the end portion of the mark is reduced, facilitating the amorphizing thereof, but in some cases, the amorphized area may become larger at the end portion than at the start portion because of an excessive cooling rate at the end portion.

Furthermore, depending on the conditions of the cooling power and its radiation time, degradation in overwrite characteristics may occur. This is presumably because the recorded mark excessively expands in lateral directions at the end portion, distorting the mark or resulting in an unerased portion after overwrite.

When recording with a higher density is considered, in the prior art insufficient symmetry between the start and end portions of recorded marks has lead to increased read jitter after overwrite, resulting in unsatisfactory read signal quality.

On the other hand, in mark spacing modulation recording, by adding a cooling pulse, a mark is formed in a larger size, increasing C/N and thus achieving good signal quality. C/N refers to the ratio of the carrier level to the noise level.

However, depending on the conditions of the cooling power, degradation in overwrite characteristics can still occur. This is presumably because the recorded mark excessively expands in lateral directions, resulting in an unerased portion after overwrite, for example.

It is an object of the present invention to provide a recording method and apparatus in which cooling conditions of heat at the mark end portion are controlled meticulously to form a recorded mark in a desired shape, thus capable of achieving a further improvement in read signal quality, alleviating thermal damage, and realizing a good cycle characteristic.

SUMMARY OF THE INVENTION

To achieve the above object, the present invention provides a recording method in which, in both mark length and mark spacing modulation recording, after laser radiation with recording power the laser power is reduced to a cooling power lower than a bias power, and after being maintained at the cooling power for a prescribed period of time, the laser power is raised back to the bias power, wherein laser radiation with the bias power is applied between the laser radiation with the recording power and the laser radiation with the cooling power that follows the recording power.

In mark length recording, the recording method reduces the laser power, after laser radiation with multiple pulses, to the cooling power lower than the bias power, and after maintaining the cooling power for a prescribed period of time, raises the laser power back to the bias power, wherein at least either the duration of cooling power radiation or the start time of the cooling power is varied in accordance with the mark length to be recorded.

In mark spacing modulation recording, the start time of the cooling power is varied in accordance with disk radius in CAV mode.

Also, in mark length modulation recording, at least either the duration of cooling power radiation or the start time of the cooling power is varied in accordance with disk radius in CAV mode.

Further, in mark length modulation recording, when a recording pulse train consists of a start pulse, an end pulse, and intermediate pulses therebetween alternating at intervals of time equal to or shorter than one data clock period, laser radiation with the cooling power is applied following the end pulse in the recording pulse train, or laser radiation with the bias power is applied between the end pulse in the recording pulse train and laser radiation with the cooling power.

In mark length modulation recording, when the recording pulse train consists of a start pulse, an end pulse, and intermediate pulses therebetween alternating at intervals of time equal to or shorter than one data clock period, and the positions of the start pulse and end pulse of the recording pulse train change in accordance with mark length and mark spacing, the duration of the laser radiation with the cooling power is fixed and, regardless of the positions of the start pulse and end pulse of the recording pulse train, the time at which to start the laser radiation with the cooling power is fixed relative to the start of the laser radiation of the end pulse in the recording pulse train, or the timing to start the laser radiation with the cooling power is determined based on the clock.

A recording apparatus for implementing the above recording method comprises: a start pulse generating circuit for generating a start pulse of prescribed duration at a start position of a Hi period of data; a burst gate generating circuit for generating a burst gate signal at a middle position of a mark when the Hi period of data is long, and for not generating a burst gate signal when the Hi period of data is short; an end pulse generating circuit for generating an end pulse of prescribed duration at an end position of the Hi period of data; a mark/space length detection circuit for generating an nT mark signal in such a manner as to contain the start pulse and end pulse when the Hi period of data is n clocks long, and for generating an mT space signal in such a manner as to contain the end pulse and start pulse at both ends of a space when a Lo period of data is m clocks long (where n and m are natural numbers existing in data train); an encoder for generating a select signal for controlling a start value selector and an end value selector (described hereinafter) from the nT mark signal and the mT space signal; a cooling pulse generating circuit for generating a cooling pulse of prescribed duration from a delayed end pulse output from an end value programmable delay line hereinafter described; a start value selector for selecting one value from among a plurality of start set values in accordance with the select signal, and for outputting the thus selected start set value; a start value sample-and-hold circuit for updating the start set value supplied from the start value selector only when the start pulse has arrived, and for holding a previous value otherwise; a start value programmable delay line for delaying the start pulse by varying an amount of delay in accordance with the start set value output from the start value sample-and-hold circuit, and for outputting the thus delayed start pulse; an end value selector for selecting one value from among a plurality of end set values in accordance with the select signal, and for outputting the thus selected end set value; an end value sample-and-hold circuit for updating the end set value supplied from the end value selector only when the end pulse has arrived, and for holding a previous value otherwise; an end value programmable delay line for delaying the end pulse by varying an amount of delay in accordance with the end set value output from the end value sample-and-hold circuit, and for outputting the thus delayed end pulse; a cooling pulse delay line for outputting a delayed cooling pulse by varying an amount of delay to be introduced in the cooling pulse; an AND gate for ANDing the burst gate signal and clock, and thereby outputting a burst pulse; an OR gate for ORing the delayed start pulse, the burst pulse, and the delayed end pulse, and thereby outputting a recording signal; an inverter for inverting the cooling pulse signal output from the cooling pulse delay line; a bias current source for supplying a bias current to a laser diode; a recording current source, connected in parallel with the bias current source, for supplying a recording current to the laser diode; a read beam current source, connected in parallel with the bias current source, for supplying a read beam current to the laser diode; a switch for turning on and off the current from the recording current source in accordance with the recording signal; a switch for turning on and off the current from the bias current source in accordance with the cooling pulse signal; and a laser diode for recording a disk signal driven by the bias current source, the recording current source, and the read beam current source in parallel.

Another recording apparatus for implementing the above recording method comprises: a start pulse generating circuit for generating a start pulse of prescribed duration at a start position of a Hi period of data; a burst gate generating circuit for generating a burst gate signal at a middle position of a mark when the Hi period of data is long, and for not generating a burst gate signal when the Hi period of data is short; an end pulse generating circuit for generating an end pulse of prescribed duration at an end position of the Hi period of data; a mark/space length detection circuit for generating an nT mark signal in such a manner as to contain the start pulse and end pulse when the Hi period of data is n clocks long, and for generating an mT space signal in such a manner as to contain the end pulse and start pulse at both ends of a space when a Lo period of data is m clocks long (where n and m are natural numbers existing in data train); an encoder for generating a select signal for controlling a start value selector and an end value selector (described hereinafter) from the nT mark signal and the mT space signal; a cooling pulse generating circuit for generating a cooling pulse of prescribed duration from the end pulse output from the end pulse generating circuit; a start value selector for selecting one value from among a plurality of start set values in accordance with the select signal, and for outputting the thus selected start set value; a start value sample-and-hold circuit for updating the start set value supplied from the start value selector only when the start pulse has arrived, and for holding a previous value otherwise; a start value programmable delay line for delaying the start pulse by varying an amount of delay in accordance with the start set value output from the start value sample-and-hold circuit, and for outputting the thus delayed start pulse; an end value selector for selecting one value from among a plurality of end set values in accordance with the select signal, and for outputting the thus selected end set value; an end value sample-and-hold circuit for updating the end set value supplied from the end value selector only when the end pulse has arrived, and for holding a previous value otherwise; an end value programmable delay line for delaying the end pulse by varying an amount of delay in accordance with the end set value output from the end value sample-and-hold circuit, and for outputting the thus delayed end pulse; a cooling pulse delay line for outputting a delayed cooling pulse by varying an amount of delay to be introduced in the cooling pulse output from the cooling pulse generating circuit; an AND gate for ANDing the burst gate signal, output from the burst gate generating circuit, and clock, and thereby outputting a burst pulse; an OR gate for ORing the delayed start pulse, the burst pulse, and the delayed end pulse, and thereby outputting a recording signal; an inverter for inverting the delayed cooling pulse signal output from the cooling pulse delay line; a bias current source for supplying a bias current to a laser diode; a recording current source, connected in parallel with the bias current source, for supplying a recording current to the laser diode; a read beam current source, connected in parallel with the bias current source, for supplying a read beam current to the laser diode; a switch for turning on and off the current from the recording current source in accordance with the recording signal; a switch for turning on and off the current from the bias current source in accordance with the cooling pulse signal; and a laser diode for recording a disk signal driven by the bias current source, the recording current source, and the read beam current source in parallel.

In mark length modulation recording, a recording pulse train for forming a recorded mark is followed by a cooling pulse train (hereinafter called the mark end portion correction pulse train), different from the recording pulse train, for correctly shaping the end portion of the recorded mark.

More specifically, the mark end portion correction pulse train is formed by radiating laser light with at least two different powers including a power lower than the bias power.

Or, laser radiation with the recording pulse train is followed by a period during which the laser power is reduced in continuous manner to a power lower than either the lower power or bias power in the recording pulse train.

Or, the recording pulse train is followed by laser radiation with the bias power preceding the formation of the mark end portion correction pulse train.

Or, the start time of the mark end portion correction pulse train or the pulse shape of the mark end portion correction pulse train is varied for each recorded mark length.

Or, when the optical disk is rotated at a constant angular velocity, the start time of the mark end portion correction pulse train or the pulse shape of the mark end portion correction pulse train is varied in accordance with radius.

According to the optical information recording method of the invention, the end portion of a recorded mark can be formed in a desired shape, achieving good read signal characteristics, and according to the optical information recording method and apparatus of the invention, thermal damage can be greatly alleviated and good cycle characteristics can be obtained.

DESCRIPTION OF THE REFERENCE NUMERALS

Figure 1:
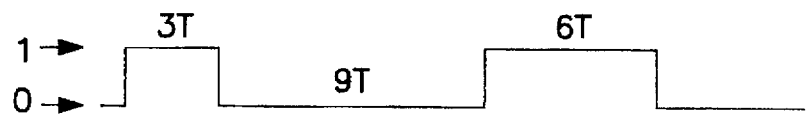
FIG. 1 is a diagram showing recording waveforms used in the embodiments of the present invention.
Figure 1:
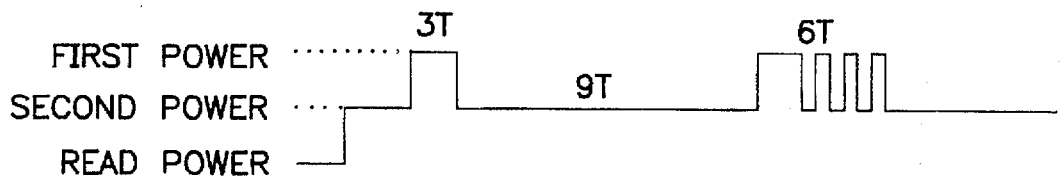
Figure 1:
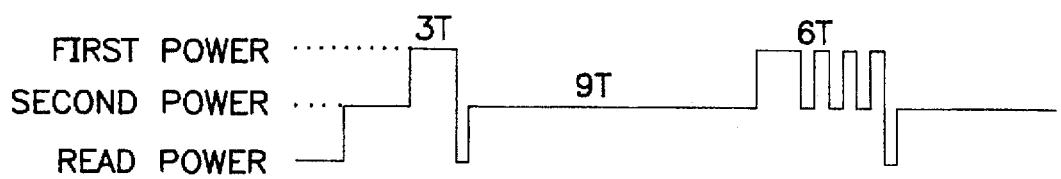
Figure 1:
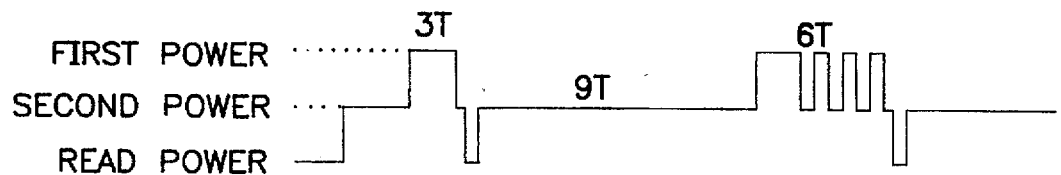

1. DATA, 2. START PULSE, 5. BURST GATE SIGNAL, 7. END PULSE, 9. 2T MARK SIGNAL, 10. 2T SPACE SIGNAL, 12. SELECT SIGNAL, 13. PLURALITY OF START SET VALUES, 15. SELECTED START SET VALUE, 18. DELAYED START PULSE, 19. PLURALITY OF END SET VALUES, 21. SELECTED END SET VALUE, 24. DELAYED END PULSE, 25. CLOCK, 26. AND GATE, 27. BURST PULSE, 28. OR GATE, 29. RECORDING SIGNAL, 30. RECORDING CURRENT SOURCE, 31. BIAS CURRENT SOURCE, 32. PLAYBACK BEAM CURRENT SOURCE, 33. SWITCH, 34. SWITCH, 35. LASER DIODE, 38. INVERTER, 39. HELD START SET VALUE, 41. COOLING PULSE, 42. DELAYED COOLING PULSE, 43. DELAYED COOLING PULSE (INVERTED), 45. HELD END SET VALUE, 36. COOLING PULSE GENERATING CIRCUIT, 37. COOLING PULSE DELAY LINE, 51. SUBSTRATE, 52, FIRST DIELECTRIC LAYER, 53. RECORDING LAYER, 54. SECOND DIELECTRIC LAYER, 55. REFLECTIVE LAYER, 56. PROTECTIVE LAYER, 61. OPTICAL DISK, 62. SPINDLE MOTOR, 63. OPTICAL HEAD, 64. LASER DRIVING CIRCUIT, 65. WAVEFORM CORRECTION CIRCUIT

DESCRIPTION OF THE PREFERRED EMBODIMENTS

The recording method of the present invention provides the following features in mark length modulation recording.

(A) Laser radiation with bias power is applied for an interval between the end of a recording pulse train and the start of laser radiation with cooling power.

(B) The duration of cooling power radiation or the start time of the cooling power radiation is varied in accordance with recorded mark length.

(C) The duration of cooling power radiation or the start time of the cooling power radiation is varied only when recorded mark length is shorter than a predetermined length.

(D) Cooling power radiation for cooling pulse application is started at a predetermined time and performed for a predetermined length of time only when recorded mark length is shorter than a predetermined length.

(E) In the case of a constant angular velocity optical disk, a cooling pulse is added only when recording a mark of length equal to or shorter than a predetermined length in the inner radius portion of the disk.

(F) In the case of a constant angular velocity optical disk, the duration of cooling power radiation or the start time of the cooling power is varied in accordance with radius position on the disk.

Further, the recording method of the present invention provides the following features in mark spacing modulation recording.

(G) Laser radiation with bias power is applied for an interval between the end of laser radiation with recording power and the start of laser radiation with cooling power.

(H) In the case of a constant angular velocity optical disk, the start time of the cooling power is varied in accordance with radius position on the disk.

With any of the above features, the recorded mark can be formed in a desired shape by preventing the shape from becoming substantially asymmetric between the start and end portions of the mark, and good read signal quality can be achieved.

The recording method of the present invention also provides the following features in mark length modulation recording.

When the recording pulse train consists of a start pulse, an end pulse, and intermediate pulses therebetween alternating at intervals of time equal to or shorter than one data clock period, (I) laser radiation with cooling power is applied following the end pulse in the recording pulse train, or (J) laser radiation with bias power is applied for an interval between the end pulse in the recording pulse train and laser radiation with the cooling power.

Further, when the recording pulse train consists of a start pulse, an end pulse, and intermediate pulses therebetween alternating at intervals of time equal to or shorter than one data clock period, and the positions of the start pulse and end pulse change in accordance with mark length and mark spacing, (K) the duration of laser radiation with cooling power is fixed and, regardless of the positions of the start pulse and end pulse of the recording pulse train, the time at which to start the laser radiation with the cooling power is fixed relative to the end pulse in the recording pulse train, or the timing to start the laser radiation with the cooling power is determined based on the clock.

With any of the above features, by varying the start pulse and end pulse positions, mark length variation due to heat interference between recorded marks can be suppressed, thus achieving high-density recording; furthermore, by using part of the bias level as the cooling power, the total energy required when recording on the thin recording film can be reduced, which serves to alleviate the problem of signal degradation due to thermal damage caused by repeating the overwrite cycle many times, and thus realizes good cycle characteristics.

The recording apparatus of the present invention comprises: a start pulse generating circuit for generating a start pulse of prescribed duration at a start position of a Hi period of data; a burst gate generating circuit for generating a burst gate signal at a middle position of a mark when the Hi period of data is long, and for not generating a burst gate signal when the Hi period of data is short; an end pulse generating circuit for generating an end pulse of prescribed duration at an end position of the Hi period of data; a mark/space length detection circuit for generating an nT mark signal in such a manner as to contain the start pulse and end pulse when the Hi period of data is n clocks long, and for generating an mT space signal in such a manner as to contain the end pulse and start pulse at both ends of a space when a Lo period of data is m clocks long (where n and m are natural numbers existing in data train); an encoder for generating a select signal for controlling a start value selector and an end value selector (described hereinafter) from the nT mark signal and the mT space signal; a cooling pulse generating circuit for generating a cooling pulse of prescribed duration from a delayed end pulse output from an end value programmable delay line hereinafter described; a start value selector for selecting one value from among a plurality of start set values in accordance with the select signal, and for outputting the thus selected start set value; a start value sample-and-hold circuit for updating the start set value supplied from the start value selector only when the start pulse has arrived, and for holding a previous value otherwise; a start value programmable delay line for delaying the start pulse by varying an amount of delay in accordance with the start set value output from the start value sample-and-hold circuit, and for outputting the thus delayed start pulse; a cooling pulse delay line for outputting a delayed cooling pulse by varying an amount of delay to be introduced in the cooling pulse output from the cooling pulse generating circuit; an end value selector for selecting one value from among a plurality of end set values in accordance with the select signal, and for outputting the thus selected end set value; an end value sample-and-hold circuit for updating the end set value supplied from the end value selector only when the end pulse has arrived, and for holding a previous value otherwise; and an end value programmable delay line for delaying the end pulse by varying an amount of delay in accordance with the end set value output from the end value sample-and-hold circuit, and for outputting the thus delayed end pulse; whereby (L) a cooling pulse is generated by supplying the delayed end pulse from the end value programmable delay line to the cooling pulse generating circuit, or (M) a cooling pulse is generated by supplying the end pulse from the end pulse generating circuit to the cooling pulse generating circuit.

With this configuration, the recording apparatus offers the same effects as achieved with the recording method described above, and thus provides good cycle characteristics by reducing the total energy required when recording on the thin recording film and thereby alleviating the problem of signal degradation due to thermal damage caused by repeating the overwrite cycle many times.

Furthermore, the recording method of the present invention provides the following features in mark length modulation recording.

(N) A recording pulse train for forming a recorded mark is followed by a mark end portion correction pulse train as a cooling pulse which is formed by radiating laser light with at least two different powers including a power lower than the bias power.

(O) Laser radiation with the recording pulse train is followed by a mark end portion correction pulse train as a cooling pulse having a period during which the laser power is reduced in continuous manner to a power lower than the bias power.

(P) A recording pulse train is followed by laser radiation with the bias power preceding the formation of the mark end portion correction pulse train as a cooling pulse.

(Q) The start time of the mark end portion correction pulse train as a cooling pulse or the pulse shape of the mark end portion correction pulse train as a cooling pulse is varied in accordance with the mark length to be recorded.

(R) In the case of a constant angular velocity optical disk, the start time of the mark end portion correction pulse train or the pulse shape of the mark end portion correction pulse train is varied in accordance with radius position on the disk.

With any of the above features, the recorded mark can be formed in a desired shape by preventing the shape from becoming substantially asymmetric between the start and end portions of the mark, and good read signal quality can be achieved.

The present invention will now be described below in further detail with reference to the accompanying drawings and by way of specific examples embodying the invention.

Figure 2:
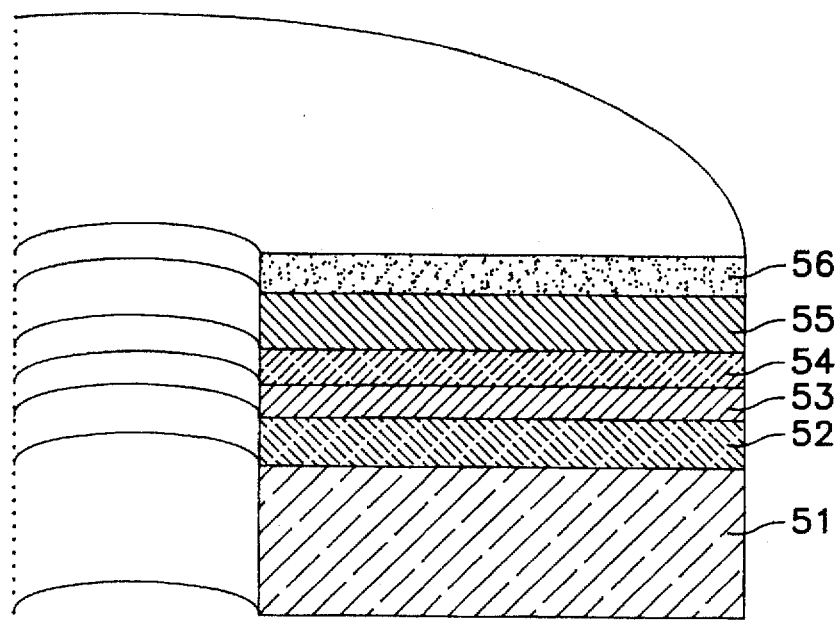
FIG. 2 is a structural diagram of an optical disk used in the embodiments of the present invention.

The disk structure used in the embodiments of the invention will be described with reference to FIG. 2. Dielectric layers, a recording layer, and a reflective layer are formed on a transparent substrate 51 by using a conventional thin-film deposition method such as vacuum evaporation or sputtering. That is, the first dielectric layer 52, recording layer 53, second dielectric layer 54, and reflective layer 55 are sequentially formed on the substrate 51. On top of that, a protective layer 56 is formed in intimate contact with the thus layered structure. An optical disk that does not have a reflective layer 55 or a protective layer 56 can also be used as an optical disk. Laser light for recording and reading is applied from underneath the substrate 51.

Glass, quartz, polycarbonate, or polymethyl methacrylate can be used as the material for the substrate 51. Further, the substrate may be constructed from a flat smooth plate or a plate with a pregrooved surface for tracking guide.

To form the protective layer 56, a resin dissolved in a solvent is applied and dried on the top surface, or a resin sheet is bonded with an adhesive.

As recording layer materials used for the recording layer 53, chalcogen alloys that exhibit an amorphous/crystalline phase change are well known, for example, alloys based on SbTe, GeSbTe, GeSbTeSe, GeSbTePd, TeGeSnAu, AgSbTe, GeTe, GaSb, InSe, InSb, InSbTe, InSbSe, InSbTeAg, etc. Alloys containing other elements can also be used as long as they do not affect the phase change characteristics or optical characteristics of the above-listed alloys.

For the dielectric layers 52 and 54, $SiO_2$, $SiO$, $TiO_2$, $MgO$, $Ta_2O_5$, $Al_2O_3$, $GeO_2$, $Si_3N_4$, $BN$, $AlN$, $SiC$, $ZnS$, $ZnSe$, $ZnTe$, $PbS$, etc. or a mixture of these can be used.

For the reflective layer 55, a material composed principally of Au, Al, Cu, Cr, Ni, Ti, or other metal element, or a mixture of these elements, or even a dielectric multilayer film having a large reflectivity at a designated wavelength can be used.

The disks used in the embodiments hereinafter described were each fabricated using a 130-mm diameter polycarbonate substrate having a signal recording track, with a ZnS-$SiO_2$ composite film as the first dielectric layer formed by sputtering on the substrate to a thickness of 1300A.

The recording layer composition of the disks used in the first and second embodiments hereinafter described was $Ge_{22}Sb_{24}Te_{54}$, and the recording layer composition of the disks used in the third to 18th embodiments hereinafter described was $Ge_{21}Sb_{26}Te_{53}$. The recording layer was formed to a thickness of 250A, and a ZnS-$SiO_2$ composite film as the second dielectric layer was formed to a thickness of 200A. The reflective layer was formed by sputtering an Al film to a thickness of 1500A. A protective layer of polycarbonate was formed on top of the reflective layer.

Figure 3:
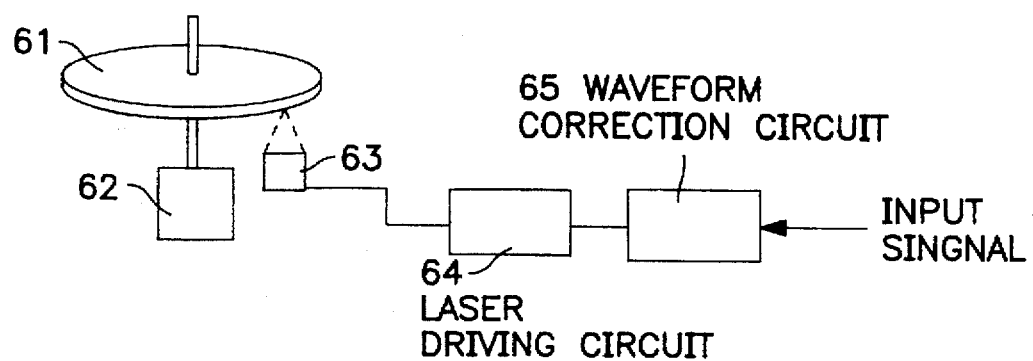
FIG. 3 is a diagram of an optical disk apparatus used in the embodiments of the present invention.

The optical disk apparatus used in all the embodiments hereinafter described will be described below with reference to FIG. 3. An optical disk 61 is mounted to a spindle motor 62 for rotation. An optical head 63 uses a semiconductor laser as a light source, and focuses a laser spot on the optical disk through a collimator lens, objective lens, etc.

The semiconductor laser is driven by a laser driving circuit 64. When recording a signal, the input signal is first waveform-corrected by a waveform correction circuit 65, and then input to the laser driving circuit 64.

Generally, increasing the complexity of the waveform correction circuit is undesirable from the economic point of view also, and it is therefore preferable that waveform correction be made as simple as possible, for example, by correcting recording waveforms only for predesignated mark lengths, rather than correcting recording waveforms for all mark lengths.

Figure 4:
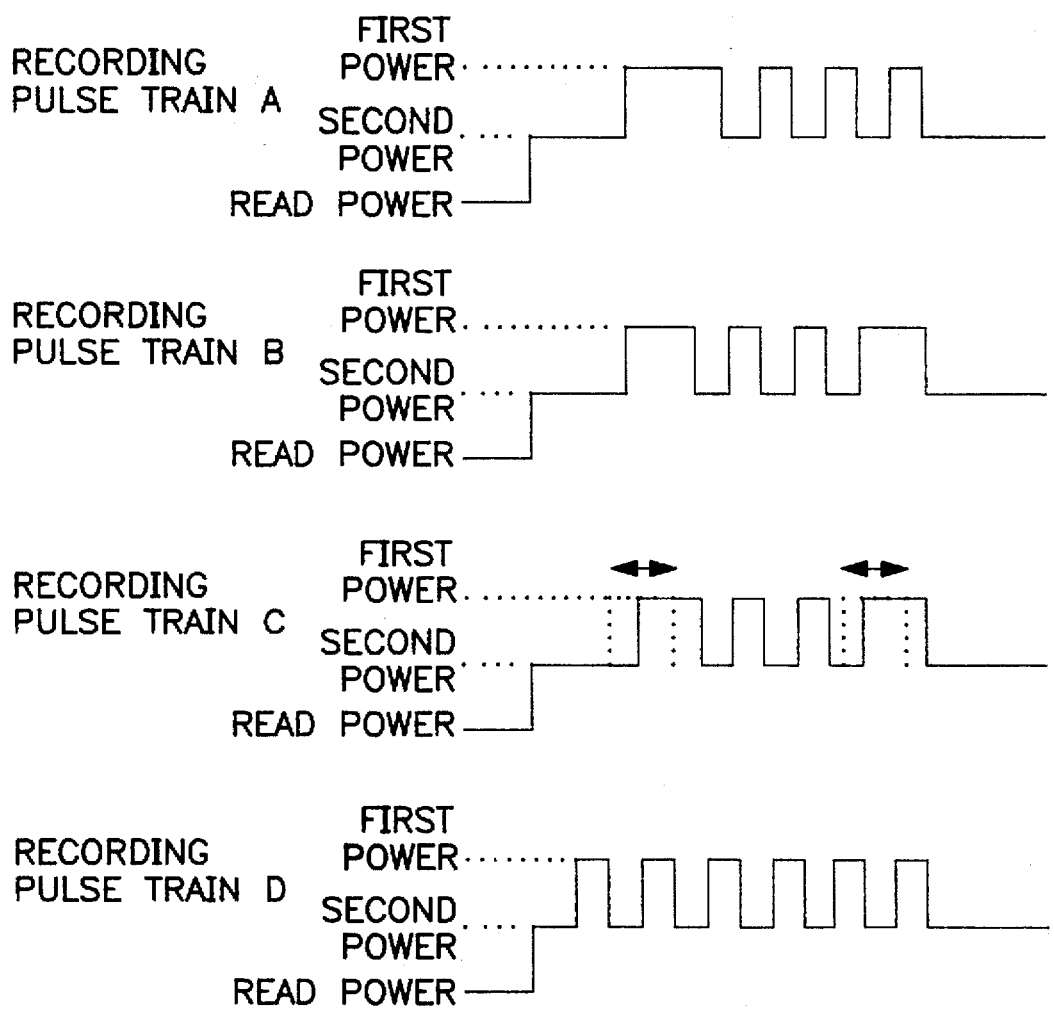
FIG. 4 is a diagram showing recording pulse trains used in the embodiments of the present invention.

Specific examples of recording pulse train patterns used in the embodiments of the invention are shown in FIG. 4. In FIG. 4, the recording pulse trains A to D show typical recording pulse train patterns when recording a 6T mark by mark length modulation recording.

Each of the embodiments hereinafter described shows the results of mark length modulation recording performed by setting the first laser power equal to the recording power, the second power equal to the bias power, and the cooling power or the lowest power in the mark end portion correction pulse train as a cooling pulse equal to the read power. Setting the first power equal to the recording power, the second power equal to the bias power, and the lowest power equal to the read power in this way is desirable particularly because the waveform correction circuit can be simplified in construction, but the laser powers applicable to the present invention are not limited to the above setting. Rather, it will be appreciated that the laser powers can be set in any desired way, provided that the first power is set equal to or larger than the recording power, the second power is set at least lower than the first power, and the lowest power is set lower than either the second power or the bias power.

In FIG. 4, the recording pulse train A consists of a start pulse with the first laser power of 1.5T duration and pulses with the laser power switched alternately between the first power and the second power at intervals of 0.5T, for the formation of a recorded mark. Here, T is one clock period.

The recording pulse train B consists of a start pulse with the first laser power of 1.0T duration, pulses with the laser power switched alternately between the first power and the second power at intervals of 0.5T, and an end pulse with the first power of 1.0T duration, for the formation of a recorded mark.

The recording pulse train C has the same pulse pattern as the recording pulse train B, except that the positions of the start and end pulses in the recording pulse train vary depending on the mark length to be recorded and the mark spacing before and after the mark.

The recording pulse train D consists of pulses with the laser light power switched alternately between the first power and the second power at intervals of 0.5T, for the formation of a recorded mark.

The pulse widths in the recording pulse trains (including the start pulse width, the end pulse width, the intermediate pulse width, and in the case of the recording pulse train D, the recording pulse width) applicable to the present invention are not limited to those shown in FIG. 4, but it will be appreciated that the pulse widths can be set in any desired way.

Figure 5:
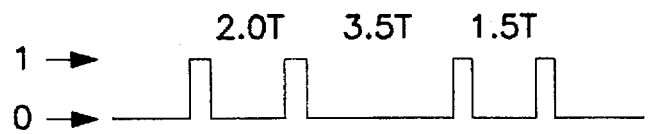
FIG. 5 is a diagram showing recording waveforms used in the embodiments of the present invention.
Figure 5:
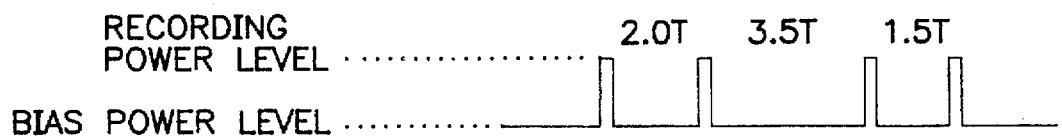
Figure 5:
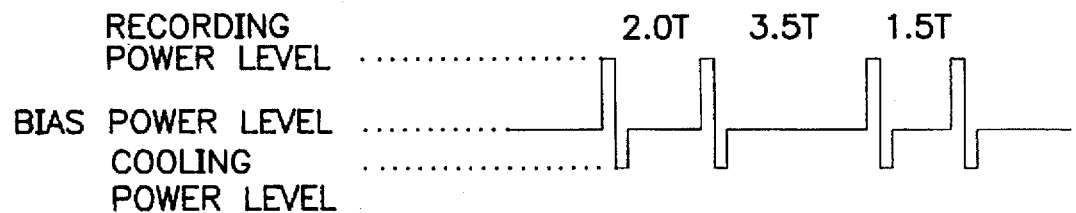
Figure 5:
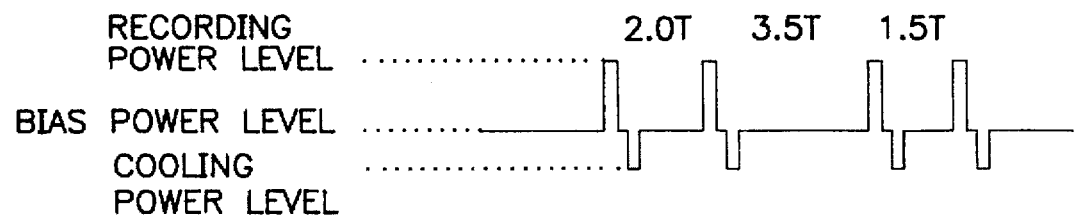

FIG. 5 shows specific examples of recording waveform patterns with a cooling pulse added in mark spacing modulation recording in the embodiments of the invention.

Input waveform A shows an example of (2, 7) modulation method. In this case, the mark duration is 0.5T. In the example shown here, the mark spacings are set to 2.0T, 3.5T, and 1.5T.

The recording waveform E is for recording the input waveform A. The recording pulse width is 0.25T.

The recording waveform F is for recording the input waveform A, with laser radiation at the cooling power level applied immediately after each application of the recording power. The recording pulse width is 0.25T, and the cooling power radiation time is 0.25T.

The recording waveform G is for recording the input waveform A, with laser radiation at the bias power level applied after each application of the recording power, followed by radiation at the cooling power level. The recording pulse width is 0.25T, the cooling power radiation time is 0.25T, and the cooling power start time is 0.25T.

FIG. 1 shows specific examples of recording waveform patterns with a cooling pulse added in mark length modulation recording in the embodiments of the invention. In the examples shown in FIG. 1, the recording pulse train A of FIG. 4 is used.

Input waveform B shows an example of an input waveform of an eight-to-fourteen modulation (EFM) signal. In EFM, data is modulated by a combination of signals of nine different lengths from 3T to 11T, where T is one clock period.

The recording waveform H is for recording the input waveform B, with no cooling pulses added.

The recording waveform I is a waveform with cooling pulses added when recording the input waveform B. The cooling pulses are added with the cooling power radiation time fixed to 0.5T and the cooling power start time fixed to 0 regardless of the immediately preceding recorded mark length.

The recording waveform J is a waveform with cooling pulses added when recording the input waveform B. The cooling pulses are added with the cooling power radiation time fixed to 0.5T and the cooling power start time fixed to 0.25T regardless of the immediately preceding recorded mark length.

The present invention will now be described in further detail using specific examples of the embodiments.

Embodiment 1

This embodiment deals with an example in which laser radiation with bias power was applied between laser radiation with recording power and laser radiation with cooling power when recording by mark spacing modulation.

An optical disk was evaluated using the following conditions. Laser light with a 680-nm wavelength was used, and the objective lens of the optical head used for recording and reading in the recording apparatus was chosen to have an NA of 0.55; with these conditions, a (2,7) modulated signal was recorded 100 times by one-beam overwrite with clock T so set as to provide the shortest mark pitch of 2.1 μm, the read signal was differentiated to detect a peak, and the jitter value, sum/Tw (%), of the detected signal was measured, where σ is the standard deviation of the jitter and Tw is the window width of the detection system. A linear velocity of 6.0 m/s was used.

In recording the signal on this disk, the power where C/N saturates when a single frequency with a mark pitch of 2.1 μm was recorded was set as the recording power, and power of a center value of the power margin where erasure ratio exceeds −20 dB when the signal was overwritten with a signal with a mark pitch of 5.6 μm was set as the bias power.

The recording waveforms used in the present embodiment and the jitter values are shown in Table 1 and Table 2, respectively.

TABLE 1

| RECORDING WAVEFORM | 1-1 | 1-2 | 1-3 |
|---|---|---|---|
| COOLING POWER RADIATION TIME | 0 T | 0.25 T | 0.25 T |
| COOLING POWER START TIME | 0 T | 0 T | 0.20 T |

TABLE 2

| RECORDING WAVEFORM | 1-1 | 1-2 | 1-3 |
|---|---|---|---|
| JITTER | 10.5% | 9.2% | 8.5% |

The recording waveform 1-1 in Table 1 is a waveform when no cooling pulses were added, like the recording waveform E in FIG. 5. The recording waveform 1-2 is a waveform when a cooling pulse was added immediately after each application of laser light at the recording power, like the waveform F in FIG. 5. The cooling power radiation time was 0.25T. The recording waveform 1-3 is a waveform when laser radiation with the bias power was applied after each application of the recording power, followed by radiation with the cooling power, like the waveform G in FIG. 5. The cooling power radiation time was 0.25T, and the cooling power start time was delayed by 0.20T from the end of the recording power radiation.

From Table 2, it can be seen that the recording waveform 1-1 has larger jitter than the other recording waveforms. The recording waveform 1-2 shows an improvement in jitter when compared with the recording waveform 1-1, but the improvement is not so good as that achieved with the recording waveform 1-3. That is, the recording waveform 1-3 with the cooling power start time delayed in accordance with the invention achieves a greater improvement in jitter than the other recording waveforms.

In this way, in mark spacing modulation, recording with small jitter can be achieved by delaying the cooling pulse start time.

In the present embodiment, read power was taken as an example of the cooling power, but it should be noted that similar results were also obtained when the cooling power was set at a level between the bias power and laser off level.

Embodiment 2

This embodiment deals with an example in which the cooling power start time was varied in accordance with disk radius when recording was made by mark spacing modulation with the optical disk being rotated at a constant angular velocity.

The following evaluation conditions were used. While rotating the disk at a constant speed of 1500 rpm, a (2,7) modulated signal was recorded 100 times by one-beam overwrite while varying clock T in such a manner as to maintain the shortest mark pitch constantly at 2.1 μm, and the jitter, expressed as σ sum/Tw (%), was measured at 23, 30, 37, 43, 50, and 57 mm radius positions, respectively. Here, σ is the standard deviation of the jitter, and Tw is the window width of the detection system. Linear velocities at the above radius positions were approximately 3.6, 4.7, 5.8, 6.8, 7.9, and 9.0 m/s, respectively. The disk used and other measuring conditions were the same as those used in the first embodiment.

The recording waveforms used in the present embodiment and the jitter values are shown in Table 3 and Table 4, respectively.

TABLE 3

| RECORDING WAVEFORM | 2-1 | 2-2 | 2-3 |
|---|---|---|---|
| COOLING POWER RADIATION TIME | 0 T | 0.30 T | 0.30 T |
| COOLING POWER START TIME | 0 T | 0 T | 0.10 T |

TABLE 4

| RADIUS | RECORDING WAVEFORM 2-1 | RECORDING WAVEFORM 2-2 | RECORDING WAVEFORM 2-3 |
|---|---|---|---|
| 23 mm | 14.1% | 10.5% | 11.2% |
| 30 mm | 12.2% | 9.7% | 10.5% |
| 37 mm | 11.3% | 9.3% | 9.8% |
| 43 mm | 10.5% | 9.4% | 8.9% |
| 50 mm | 10.8% | 10.0% | 9.2% |
| 57 mm | 11.4% | 10.7% | 9.7% |

The recording waveform 2-1 in Table 3 is a waveform when no cooling pulses were added, like the recording waveform E in FIG. 5. The recording waveform 2-2 is a waveform when laser radiation with the cooling power was applied after laser radiation with the recording power, like the waveform F in FIG. 5. The cooling power radiation time was 0.30T. The recording waveform 2-3 is a waveform when laser radiation with the bias power was applied after radiation with the recording power, followed by radiation with the cooling power, like the waveform G in FIG. 5. The cooling power radiation time was 0.30T, and the cooling power start time was 0.10T from the end of radiation with the recording power.

From Table 4, it can be seen that the recording waveform 2-1 has larger jitter at both the inner and outer radius portions of the disk when compared with the other waveforms. In the case of the recording waveform 2-2, jitter is reduced at the inner radius portion of the disk when compared with the other recording waveforms. In the case of the recording waveform 2-3, while jitter is larger at the inner radius portion of the disk when compared with the recording waveform 2-2, jitter is smaller at the outer radius portion of the disk than the jitter in the other waveforms.

This shows that, if the recording waveform 2-2 is applied, for example, for the inner radius portion of the disk and the recording waveform 2-3 is applied, for example, for the outer radius portion of the disk, that is, if a waveform where the cooling power start time is advanced at the inner radius portion of the disk is used, recording with good read jitter characteristics can be achieved.

In this way, in the case of a constant angular velocity optical disk, recording with small jitter can be achieved across the disk radius by advancing the cooling power start time at the inner radius portion of the disk.

This embodiment, as in the first embodiment, showed the results obtained when the read power was used as the cooling power, but it will be appreciated that similar results can also be obtained if the cooling power is set at a level between the bias power and laser off level.

Embodiment 3

This embodiment deals with an example in which laser radiation with the bias power was applied between laser radiation with the recording power and laser radiation with the cooling power when recording by mark length modulation.

An optical disk was evaluated using the following conditions. Laser light with a 680-nm wavelength was used, and the objective lens of the optical head used for recording and reading in the recording apparatus was chosen to have an NA of 0.55; with these conditions, an 8-14 modulated (EFM) input signal was recorded 100 times by one-beam overwrite with clock T so set as to provide the shortest mark length of 0.90 μm, and the jitter values, σ sum/Tw (%), at the zero cross points of the read signals of 3T to 11T were measured. Here, σ sum is the standard deviation of the sum of the jitters from 3T to 11T, and Tw is the window width of the detection system. A linear velocity of 4.0 m/s was used.

In recording the signal on this disk, the power where C/N saturates when a single frequency forming a recorded mark length of 0.9 μm was recorded was set as the recording power, and power of a center value of the power margin where erasure ratio exceeds −20 dB when the signal of the 3T mark was overwritten with a single frequency equivalent to 11T was set as the bias power.

The recording waveforms used in the present embodiment and the jitter values are shown in Table 5 and Table 6, respectively.

TABLE 5

| RECORDING WAVEFORM | MARK LENGTH | 3 T | 4 T | 5 T | 6 T | 7 T | 8 T | 9 T | 10 T | 11 T |
|---|---|---|---|---|---|---|---|---|---|---|
| 3-1 | COOLING POWER RADIATION TIME | 0 T | 0 T | 0 T | 0 T | 0 T | 0 T | 0 T | 0 T | 0 T |
|  | COOLING POWER START TIME | 0 T | 0 T | 0 T | 0 T | 0 T | 0 T | 0 T | 0 T | 0 T |
| 3-2 | COOLING POWER RADIATION TIME | 0.50 T | 0.50 T | 0.50 T | 0.50 T | 0.50 T | 0.50 T | 0.50 T | 0.50 T | 0.50 T |
|  | COOLING POWER START TIME | 0 T | 0 T | 0 T | 0 T | 0 T | 0 T | 0 T | 0 T | 0 T |
| 3-3 | COOLING POWER RADIATION TIME | 0.50 T | 0.50 T | 0.50 T | 0.50 T | 0.50 T | 0.50 T | 0.50 T | 0.50 T | 0.50 T |
|  | COOLING POWER START TIME | 0.20 T | 0.20 T | 0.20 T | 0.20 T | 0.20 T | 0.20 T | 0.20 T | 0.20 T | 0.20 T |

TABLE 6

| RECORDING WAVEFORM | 3-1 | 3-2 | 3-3 |
|---|---|---|---|
| JITTER | 11.6% | 9.6% | 9.2% |

Table 5 shows the cooling power radiation time and cooling power start time for each of the three recording waveforms when recording marks of mark lengths 3T to 11T.

In the present embodiment, the recording pulse train A shown in FIG. 4 was used.

The recording waveform 3-1 in Table 5 is a waveform when no cooling pulses were added, like the recording waveform H in FIG. 1. The recording waveform 3-2 is a waveform when laser radiation with the cooling power was applied immediately following the end of the recording pulse train, like the recording waveform I in FIG. 1. The cooling power radiation time was fixed to 0.5T, and the cooling power start time was fixed to 0, regardless of the mark length 3T to 11T. The recording waveform 3-3 is a waveform when bias power radiation was applied immediately following the end of the recording pulse train, and followed by radiation with the cooling power, like the recording waveform J in FIG. 1. The cooling power radiation time and the cooling power start time were 0.5T and 0.2T, respectively, regardless of the mark length.

From Table 6, it can be seen that the recording waveform 3-1 has larger jitter than the other recording waveforms. The recording waveform 3-2 shows an improvement in jitter when compared with the recording waveform 3-1. On the other hand, in the case of the recording waveform 3-3 where the cooling power start time was delayed in accordance with the present invention, jitter is reduced as compared to the other waveforms, since the symmetry at the start and end portions of the mark is better controlled.

In this way, by adding laser radiation with the bias power between laser radiation with the recording power and laser radiation with the cooling power, recording with small jitter can be achieved.

In the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used as the recording pulse train, but it should be noted that similar results were also obtained in the case of the recording pulse trains B, C, and D shown in FIG. 4.

Embodiment 4

This embodiment deals with an example in which only the cooling power radiation time was varied in accordance with recorded mark length.

The respective recording waveforms and jitter values are shown in Table 7 and Table 8, respectively. The measuring conditions were the same as those used in the third embodiment.

TABLE 8

| RECORDING WAVEFORM | 4-1 | 4-2 | 4-3 | 4-4 |
|---|---|---|---|---|
| JITTER | 11.6% | 10.3% | 9.6% | 7.5% |

Table 7 shows the cooling power radiation time and cooling power start time for each of the four recording waveforms when recording marks of mark lengths 3T to 11T.

In the present embodiment, the recording pulse train A shown in FIG. 4 was used.

The recording waveform 4-1 in Table 7 is a waveform when no cooling pulses were added, like the recording waveform H in FIG. 1. The recording waveform 4-2 is a waveform when the cooling power radiation time was fixed to 0.10T regardless of the mark length and the cooling power radiation was started immediately following the end of the recording pulse train, like the waveform I in FIG. 1. The recording waveform 4-3 is a waveform when radiation with the cooling power was applied immediately following the end of the recording pulse train, like the recording waveform I in FIG. 1. However, the cooling power radiation time was set longer than that in the recording waveform 4-2, that is, to 0.50T. Further, the recording waveform 4-4 is a waveform when radiation with the cooling power was applied immediately following the end of the recording pulse train, like

TABLE 7

| RECORDING WAVEFORM | MARK LENGTH | 3 T | 4 T | 5 T | 6 T | 7 T | 8 T | 9 T | 10 T | 11 T |
|---|---|---|---|---|---|---|---|---|---|---|
| 4-1 | COOLING POWER RADIATION TIME | 0 T | 0 T | 0 T | 0 T | 0 T | 0 T | 0 T | 0 T | 0 T |
|  | COOLING POWER START TIME | 0 T | 0 T | 0 T | 0 T | 0 T | 0 T | 0 T | 0 T | 0 T |
| 4-2 | COOLING POWER RADIATION TIME | 0.10 T | 0.10 T | 0.10 T | 0.10 T | 0.10 T | 0.10 T | 0.10 T | 0.10 T | 0.10 T |
|  | COOLING POWER START TIME | 0 T | 0 T | 0 T | 0 T | 0 T | 0 T | 0 T | 0 T | 0 T |
| 4-3 | COOLING POWER RADIATION TIME | 0.50 T | 0.50 T | 0.50 T | 0.50 T | 0.50 T | 0.50 T | 0.50 T | 0.50 T | 0.50 T |
|  | COOLING POWER START TIME | 0 T | 0 T | 0 T | 0 T | 0 T | 0 T | 0 T | 0 T | 0 T |
| 4-4 | COOLING POWER RADIATION TIME | 0.50 T | 0.45 T | 0.40 T | 0.35 T | 0.30 T | 0.25 T | 0.20 T | 0.15 T | 0.10 T |
|  | COOLING POWER START TIME | 0 T | 0 T | 0 T | 0 T | 0 T | 0 T | 0 T | 0 T | 0 T | the recording waveform I in FIG. 1, and when the cooling power radiation time was increased with decreasing mark length.

As shown in Table 7, the recording waveform 4-1 has larger jitter than the other recording waveforms. The recording waveforms 4-2 and 4-3 both show an improvement in jitter when compared with the recording waveform 4-1, but the improvement is not so good as that achieved with the recording waveform 4-4.

On the other hand, in the case of the recording waveform 4-4 where the cooling power radiation time was increased with decreasing mark length in accordance with the present invention, a significant improvement in jitter value is achieved as compared with the other waveforms, since the symmetry at the start and end portions of the recorded mark is better controlled for each mark length.

In this way, by varying the cooling power radiation time in accordance with recorded mark length, recording with small jitter can be achieved.

In the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used as the recording pulse train, but it should be noted that similar results were also obtained in the case of the recording pulse trains B, C, and D shown in FIG. 4.

Embodiment 5

This embodiment deals with an example in which the cooling power radiation time was varied in accordance with mark length only when the mark length was shorter than a predetermined length.

The respective recording waveforms and jitter values are shown in Table 9 and Table 10, respectively. The measuring conditions were the same as those used in the third embodiment.

TABLE 9

| RECORDING WAVEFORM | MARK LENGTH | 3 T | 4 T | 5 T | 6 T | 7 T | 8 T | 9 T | 10 T | 11 T |
|---|---|---|---|---|---|---|---|---|---|---|
| 5-1 | COOLING POWER RADIATION TIME | 0 T | 0 T | 0 T | 0 T | 0 T | 0 T | 0 T | 0 T | 0 T |
|  | COOLING POWER START TIME | 0 T | 0 T | 0 T | 0 T | 0 T | 0 T | 0 T | 0 T | 0 T |
| 5-2 | COOLING POWER RADIATION TIME | 0.50 T | 0.45 T | 0.40 T | 0.35 T | 0.30 T | 0.30 T | 0.30 T | 0.30 T | 0.30 T |
|  | COOLING POWER START TIME | 0 T | 0 T | 0 T | 0 T | 0 T | 0 T | 0 T | 0 T | 0 T |
| 5-3 | COOLING POWER RADIATION TIME | 0.50 T | 0.45 T | 0.45 T | 0.45 T | 0.45 T | 0.45 T | 0.45 T | 0.45 T | 0.45 T |
|  | COOLING POWER START TIME | 0 T | 0 T | 0 T | 0 T | 0 T | 0 T | 0 T | 0 T | 0 T |

TABLE 10

| RECORDING WAVEFORM | 5-1 | 5-2 | 5-3 |
|---|---|---|---|
| JITTER | 11.6% | 8.3% | 10.0% |

Table 9 shows the cooling power radiation time and cooling power start time for each of the three recording waveforms when recording marks of mark lengths 3T to 11T.

In the present embodiment, the recording pulse train A shown in FIG. 4 was used.

The recording waveform 5-1 in Table 9 is a waveform when no cooling pulses were added, like the recording waveform H in FIG. 1. The recording waveform 5-2 is a waveform when radiation with the cooling power was applied immediately following the end of the recording pulse train, like the recording waveform I in FIG. 1, but the cooling power radiation time was varied only when recording short mark lengths of 3T to 6T, the radiation time increasing with decreasing recorded mark length. Further, the recording waveform 5-3 is a waveform when the cooling power radiation time was increased only for the mark length of 3T, and when a cooling pulse was added immediately following the end of the recording pulse train.

As shown in Table 10, the recording waveform 5-1 has larger jitter than the other recording waveforms. On the other hand, in the case of the recording waveform 5-2 where the cooling power radiation time was increased with decreasing mark length when recording marks of lengths 3T to 6T in accordance with the present invention, an improvement in jitter is apparent when compared with the recording waveform 5-1.

In the case of the recording waveform 5-3 where the cooling power radiation time was increased only for the recorded mark length of 3T in accordance with the present invention, jitter is larger than that in the recording waveform length and only the cooling power start time was varied in accordance with the mark length to be recorded.

The respective recording waveforms and jitter values are shown in Table 11 and Table 12, respectively. The measuring conditions were the same as those used in the third embodiment.

TABLE 11

| RECORDING WAVEFORM | MARK LENGTH | 3 T | 4 T | 5 T | 6 T | 7 T | 8 T | 9 T | 10 T | 11 T |
|---|---|---|---|---|---|---|---|---|---|---|
| 6-1 | COOLING POWER RADIATION TIME | 0 T | 0 T | 0 T | 0 T | 0 T | 0 T | 0 T | 0 T | 0 T |
|  | COOLING POWER START TIME | 0 T | 0 T | 0 T | 0 T | 0 T | 0 T | 0 T | 0 T | 0 T |
| 6-2 | COOLING POWER RADIATION TIME | 0.50 T | 0.50 T | 0.50 T | 0.50 T | 0.50 T | 0.50 T | 0.50 T | 0.50 T | 0.50 T |
|  | COOLING POWER START TIME | 0 T | 0 T | 0 T | 0 T | 0 T | 0 T | 0 T | 0 T | 0 T |
| 6-3 | COOLING POWER RADIATION TIME | 0.50 T | 0.50 T | 0.50 T | 0.50 T | 0.50 T | 0.50 T | 0.50 T | 0.50 T | 0.50 T |
|  | COOLING POWER START TIME | 0.40 T | 0.40 T | 0.40 T | 0.40 T | 0.40 T | 0.40 T | 0.40 T | 0.40 T | 0.40 T |
| 6-4 | COOLING POWER RADIATION TIME | 0.50 T | 0.50 T | 0.50 T | 0.50 T | 0.50 T | 0.50 T | 0.50 T | 0.50 T | 0.50 T |
|  | COOLING POWER START TIME | 0 T | 0.05 T | 0.10 T | 0.15 T | 0.20 T | 0.25 T | 0.30 T | 0.35 T | 0.40 T |

5-2, but an improvement is achieved as compared with the recording waveform 5-1.

In this way, by varying the cooling pulse radiation time only when the recorded mark length is shorter than a predetermined length, recording with small jitter can be achieved. The waveform thus obtained is also considered preferable from the economic point of view, since recording circuitry can be simplified.

In the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used as the recording pulse train, but it should be noted that similar results were also obtained in the case of the recording pulse trains B, C, and D shown in FIG. 4.

Embodiment 6

This embodiment deals with an example in which the cooling power radiation time was fixed regardless of mark

TABLE 12

| RECORDING WAVEFORM | 6-1 | 6-2 | 6-3 | 6-4 |
|---|---|---|---|---|
| JITTER | 11.6% | 9.6% | 10.0% | 8.0% |

Table 11 shows the cooling power radiation time and cooling power start time for each of the four recording waveforms when recording marks of mark lengths 3T to 11T.

In the present embodiment, the recording pulse train A shown in FIG. 4 was used.

The recording waveform 6-1 in Table 11 is a waveform when no cooling pulses were added after the end of the recording pulse train, like the recording waveform H in FIG. 1. The recording waveform 6-2 is a waveform when radiation with the cooling power was applied immediately following the end of the recording pulse train, as in the recording waveform I in FIG. 1. Here, the cooling power radiation time was fixed to 0.50T regardless of the mark length to be recorded. The recording waveform 6-3 is a waveform when radiation with the bias power was applied following the end of the recording pulse train, and followed by radiation with the cooling power, like the recording waveform J in FIG. 1. Here, the cooling power radiation time was fixed to 0.50T, and the cooling power start time to 0.4T, regardless of the mark length to be recorded. Further, the recording waveform 6-4 is a waveform when the cooling power radiation time was fixed to 0.5T regardless of the mark length, as in the recording waveform 6-3, but when the cooling power start time was advanced with decreasing recorded mark length.

As shown in Table 12, the recording waveform 6-1 has larger jitter than the other recording waveforms. The recording waveforms 6-2 and 6-3 both show an improvement in jitter when compared with the recording waveform 6-1. On the other hand, in the case of the waveform 6-4 where the cooling power start time was advanced with decreasing recorded mark length in accordance with the present invention, the jitter is further reduced as compared with the other recording waveforms.

In this way, by varying the cooling power start time in accordance with recorded mark length, recording with small jitter can be achieved.

In the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used as the recording pulse train, but it should be noted that similar results were also obtained in the case of the recording pulse trains B, C, and D shown in FIG. 4.

Embodiment 7

This embodiment deals with an example in which the cooling power radiation time was fixed, but the cooling power start time was varied in accordance with the mark length to be recorded, only when the mark length was shorter than a predetermined length.

The respective recording waveforms and jitter values are shown in Table 13 and Table 14, respectively. The measuring conditions were the same as those used in the third embodiment.

TABLE 13

| RECORDING WAVEFORM | MARK LENGTH | 3 T | 4 T | 5 T | 6 T | 7 T | 8 T | 9 T | 10 T | 11 T |
|---|---|---|---|---|---|---|---|---|---|---|
| 7-1 | COOLING POWER RADIATION TIME | 0 T | 0 T | 0 T | 0 T | 0 T | 0 T | 0 T | 0 T | 0 T |
|  | COOLING POWER START TIME | 0 T | 0 T | 0 T | 0 T | 0 T | 0 T | 0 T | 0 T | 0 T |
| 7-2 | COOLING POWER RADIATION TIME | 0.50 T | 0.50 T | 0.50 T | 0.50 T | 0.50 T | 0.50 T | 0.50 T | 0.50 T | 0.50 T |
|  | COOLING POWER START TIME | 0.00 T | 0.05 T | 0.10 T | 0.15 T | 0.20 T | 0.20 T | 0.20 T | 0.20 T | 0.20 T |
| 7-3 | COOLING POWER RADIATION TIME | 0.50 T | 0.50 T | 0.50 T | 0.50 T | 0.50 T | 0.50 T | 0.50 T | 0.50 T | 0.50 T |
|  | COOLING POWER START TIME | 0.00 T | 0.20 T | 0.20 T | 0.20 T | 0.20 T | 0.20 T | 0.20 T | 0.20 T | 0.20 T |

TABLE 14

| RECORDING WAVEFORM | 7-1 | 7-2 | 7-3 |
|---|---|---|---|
| JITTER | 11.6% | 8.4% | 9.0% |

Table 13 shows the cooling power radiation time and cooling power start time for each of the three recording waveforms when recording marks of mark lengths 3T to 11T.

In the present embodiment, the recording pulse train A shown in FIG. 4 was used.

The recording waveform 7-1 in Table 13 is a waveform when no cooling pulses were added, like the recording waveform H in FIG. 1. The recording waveform 7-2 is a waveform when radiation with the bias power was applied following the end of the recording pulse train, and followed by radiation with the cooling power, like the recording waveform J in FIG. 1, and when the cooling pulse start time was advanced with decreasing mark length when recording marks of lengths 3T to 6T. Here, the cooling power radiation time was fixed to 0.50T regardless of the mark length. Further, the recording waveform 7-3 is a waveform when a cooling pulse was added immediately following the end of the recording pulse train only when recording a 3T mark, and when the cooling power start time was delayed by a fixed length of time, that is, 0.20T when recording marks of 4T to 11T.

As shown in Table 14, the recording waveform 7-1 has larger jitter than the other recording waveforms. On the other hand, in the case of the recording waveform 7-2 where the cooling power start time was advanced with decreasing mark length for the recorded mark lengths of 3T to 6T in accordance with the present invention, an improvement in jitter is apparent when compared with the recording waveform 7-1. Further, in the case of the recording waveform 7-3 where the cooling pulse start time was advanced only for the recorded mark length of 3T in accordance with the present invention, jitter is larger than that in the recording waveform 7-2, but an improvement is achieved as compared with the recording waveform 7-1.

In this way, by varying the cooling pulse start time only when the recorded mark length is shorter than a predetermined length, recording with small jitter can be achieved. The waveform thus obtained is also considered preferable from the economic point of view, since recording circuitry can be simplified.

In the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used as the recording pulse train, but it should be noted that similar results were also obtained in the case of the recording pulse trains B, C, and D shown in FIG. 4.

Embodiment 8

This embodiment deals with an example in which a cooling pulse with a fixed cooling power radiation time and a fixed cooling power start time was added only when recording a mark not longer than a predetermined length.

The respective recording waveforms and jitter values are shown in Table 15 and Table 16, respectively. The measuring conditions were the same as those used in the third embodiment.

TABLE 16

| RECORDING WAVEFORM | 8-1 | 8-2 | 8-3 |
|---|---|---|---|
| JITTER | 11.6% | 8.7% | 9.8% |

Table 15 shows the cooling power radiation time and cooling power start time for each of the three recording waveforms when recording marks of mark lengths 3T to 11T.

In the present embodiment, the recording pulse train A shown in FIG. 4 was used.

The recording waveform 8-1 in Table 15 is a waveform when no cooling pulses were added, like the recording waveform H in FIG. 1. The recording waveform 8-2 is a waveform when radiation with the bias power was applied following the end of the recording pulse train, and followed by radiation with the cooling power, like the recording waveform J in FIG. 1, only when the mark length to be recorded was one of 3T to 6T. Here, for the mark lengths of 3T to 6T, the cooling power radiation time was set to 0.43T and the cooling power start time to 0.08T to add a cooling pulse. Further, the recording waveform 8-3 is a waveform when a cooling pulse, with the cooling power radiation time fixed to 0.43T and the cooling power start time fixed to 0.08T, was added only when the mark length to be recorded was 3T.

As shown in Table 16, the recording waveform 8-1 has larger jitter than the other recording waveforms. On the other hand, in the case of the recording waveform 8-2 where a cooling pulse with a fixed pulse duration and fixed pulse start time was added only when recording a mark not longer than a predetermined mark length in accordance with the present invention, an improvement in jitter is apparent when compared with the recording waveform 8-1. Further, in the

TABLE 15

| RECORDING WAVEFORM | MARK LENGTH | 3 T | 4 T | 5 T | 6 T | 7 T | 8 T | 9 T | 10 T | 11 T |
|---|---|---|---|---|---|---|---|---|---|---|
| 8-1 | COOLING POWER RADIATION TIME | 0 T | 0 T | 0 T | 0 T | 0 T | 0 T | 0 T | 0 T | 0 T |
|  | COOLING POWER START TIME | 0 T | 0 T | 0 T | 0 T | 0 T | 0 T | 0 T | 0 T | 0 T |
| 8-2 | COOLING POWER RADIATION TIME | 0.43 T | 0.43 T | 0.43 T | 0.43 T | 0 T | 0 T | 0 T | 0 T | 0 T |
|  | COOLING POWER START TIME | 0.08 T | 0.08 T | 0.08 T | 0.08 T | 0 T | 0 T | 0 T | 0 T | 0 T |
| 8-3 | COOLING POWER RADIATION TIME | 0.43 T | 0 T | 0 T | 0 T | 0 T | 0 T | 0 T | 0 T | 0 T |
|  | COOLING POWER START TIME | 0.08 T | 0 T | 0 T | 0 T | 0 T | 0 T | 0 T | 0 T | 0 T | case of the recording waveform 8-3 where a cooling pulse was added only when recording a mark of the shortest mark length in accordance with the present invention, an improvement in jitter is achieved as compared with the recording waveform 8-1, though the improvement is no so good as that achieved with the recording waveform 8-2.

In this way, by adding a cooling pulse with a fixed pulse duration and fixed pulse start time only when recording a mark not longer than a predetermined mark length, recording with small jitter can be achieved. The waveform thus obtained is also considered preferable from the economic point of view, since recording circuitry can be simplified.

In the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used as the recording pulse train, but it should be noted that similar results were also obtained in the case of the recording pulse trains B, C, and D shown in FIG. 4.

Embodiment 9

This embodiment deals with an example in which, when an optical disk was rotated at a constant angular velocity, a cooling pulse was added only when recording a mark not longer than a predetermined mark length at the inner radius portion of the disk.

The following evaluation conditions were used. While rotating the disk at a constant speed of 1000 rpm, an EFM signal was recorded 100 times by one-beam overwrite while varying clock T in such a manner as to maintain the shortest mark length constantly at 0.90 μm, and the jitter values, expressed as σ/Tw (%), at the zero cross points of the read signals of 3T to 11T, were measured at 23, 30, 37, 43, 50, and 57 mm radius positions. Here, σ is the standard deviation of the jitter, and Tw is the window width of the detection system. Linear velocities at the above radius positions were about 2.4, 3.1, 3.9, 4.5, 5.2, and 6.0 m/s, respectively. The other measuring conditions were the same as those used in the third embodiment.

The respective recording waveforms and jitter values are shown in Table 17 and Table 18, respectively.

TABLE 17

| RECORDING WAVEFORM | MARK LENGTH | 3 T | 4 T | 5 T | 6 T | 7 T | 8 T | 9 T | 10 T | 11 T |
| --- | --- | --- | --- | --- | --- | --- | --- | --- | --- | --- |
| 9-1 | COOLING POWER RADIATION TIME | 0 T | 0 T | 0 T | 0 T | 0 T | 0 T | 0 T | 0 T | 0 T |
|  | COOLING POWER START TIME | 0 T | 0 T | 0 T | 0 T | 0 T | 0 T | 0 T | 0 T | 0 T |
| 9-2 | COOLING POWER RADIATION TIME | 0.43 T | 0.43 T | 0.43 T | 0.43 T | 0 T | 0 T | 0 T | 0 T | 0 T |
|  | COOLING POWER START TIME | 0.08 T | 0.08 T | 0.08 T | 0.08 T | 0 T | 0 T | 0 T | 0 T | 0 T |
| 9-3 | COOLING POWER RADIATION TIME | 0.43 T | 0 T | 0 T | 0 T | 0 T | 0 T | 0 T | 0 T | 0 T |
|  | COOLING POWER START TIME | 0.08 T | 0 T | 0 T | 0 T | 0 T | 0 T | 0 T | 0 T | 0 T |

TABLE 18

| RADIUS | RECORDING WAVEFORM 9-1 | RECORDING WAVEFORM 9-2 | RECORDING WAVEFORM 9-3 |
| --- | --- | --- | --- |
| 23 mm | 14.0% | 11.5% | 12.8% |
| 30 mm | 13.3% | 9.8% | 10.8% |
| 37 mm | 11.8% | 9.0% | 10.0% |
| 43 mm | 10.9% | 10.5% | 10.7% |
| 50 mm | 11.4% | 12.2% | 11.8% |
| 57 mm | 12.3% | 13.4% | 12.5% |

Table 17 shows the cooling power radiation time and cooling power start time for each of the three recording waveforms when recording marks of mark lengths 3T to 11T.

In the present embodiment, the recording pulse train A shown in FIG. 4 was used.

The recording waveform 9-1 in Table 17 is a waveform when no cooling pulses were added, like the recording waveform H in FIG. 1. The recording waveform 9-2 is a waveform when radiation with the bias power was applied following the end of the recording pulse train, and followed by radiation with the cooling power, like the recording waveform J in FIG. 1, only when the mark length to be recorded was one of 3T to 6T. Here, the cooling power radiation time was fixed to 0.43T and the cooling power start time to 0.08T. No cooling pulses were added when recording marks of 7T to 11T. Further, the recording waveform 9-3 is a waveform when no cooling pulses were added except when recording a 3T mark, like the recording waveform H in FIG. 1; the cooling radiation time was set to 0.43T and the cooling power start time to 0.08T only when recording a 3T mark.

As shown in Table 18, the recording waveform 9-1 has larger jitter than the other recording waveforms, especially at the inner radius portion of the disk. On the other hand, in the case of the recording waveform 9-2 where a cooling pulse was added only when recording a short mark, an improvement in jitter was observed at the inner radius portion of the disk when compared with the recording waveform 9-1. In the case of the recording waveform 9-3 also where a cooling pulse was added only when recording a 3T mark, an improvement in jitter was observed at the inner radius portion of the disk when compared with the recording waveform 9-1. This shows that, when recording on the inner radius portion of the disk, for example, up to 37 mm or 43 mm radius, the recording waveform 9-2 or 9-3 should be used, and when recording on the disk portion outside that radius, the recording waveform 9-1 should be used.

as the recording pulse train, but it should be noted that similar results were also obtained in the case of the recording pulse trains B, C, and D shown in FIG. 4.

Embodiment 10

This embodiment deals with an example in which, when an optical disk was rotated at a constant angular velocity, the cooling power radiation time and the cooling power start time were varied in accordance with the radius of the disk.

The respective recording waveforms and jitter values are shown in Table 19 and Table 20, respectively. The measuring conditions were the same as those used in the ninth embodiment.

TABLE 19

| RECORDING WAVEFORM | MARK LENGTH | 3 T | 4 T | 5 T | 6 T | 7 T | 8 T | 9 T | 10 T | 11 T |
| --- | --- | --- | --- | --- | --- | --- | --- | --- | --- | --- |
| 10-1 | COOLING POWER RADIATION TIME | 0 T | 0 T | 0 T | 0 T | 0 T | 0 T | 0 T | 0 T | 0 T |
|  | COOLING POWER START TIME | 0 T | 0 T | 0 T | 0 T | 0 T | 0 T | 0 T | 0 T | 0 T |
| 10-2 | COOLING POWER RADIATION TIME | 0.50 T | 0.45 T | 0.40 T | 0.35 T | 0.30 T | 0.25 T | 0.20 T | 0.15 T | 0.10 T |
|  | COOLING POWER START TIME | 0 T | 0 T | 0 T | 0 T | 0 T | 0 T | 0 T | 0 T | 0 T |
| 10-3 | COOLING POWER RADIATION TIME | 0.50 T | 0.50 T | 0.50 T | 0.50 T | 0.50 T | 0.50 T | 0.50 T | 0.50 T | 0.50 T |
|  | COOLING POWER START TIME | 0 T | 0.05 T | 0.10 T | 0.15 T | 0.20 T | 0.25 T | 0.30 T | 0.35 T | 0.40 T |

By using the recording waveform 9-2 or 9-3 when recording on the inner radius portion of the disk, and the recording waveform 9-1, with no cooling pulses added, when recording on the outer radius portion, as described above, recording with good jitter characteristics can be obtained at any radius portion of the disk.

Thus, in the case of a constant angular velocity optical disk, good quality recording with small jitter can be achieved at any radius portion of the disk by adding a cooling pulse only when recording a mark shorter than a predetermined mark length at the disk's inner radius portion inside a predetermined radius. The waveform thus obtained is also considered preferable from the economic point of view, since recording circuitry can be simplified.

In the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used

TABLE 20

| RADIUS | RECORDING WAVEFORM 10-1 | RECORDING WAVEFORM 10-2 | RECORDING WAVEFORM 10-3 |
| --- | --- | --- | --- |
| 23 mm | 14.0% | 11.5.% | 11.3% |
| 30 mm | 13.3% | 10.2% | 10.4% |
| 37 mm | 11.8% | 8.0% | 8.3% |
| 43 mm | 10.9% | 9.9% | 10.4% |
| 50 mm | 11.4% | 11.9% | 12.2% |
| 57 mm | 12.3% | 13.5% | 14.2% |

Table 19 shows the cooling power radiation time and cooling power start time for each of the three recording waveforms when recording marks of mark lengths 3T to 11T.

In the present embodiment, the recording pulse train A shown in FIG. 4 was used.

The recording waveform 10-1 in Table 19 is a waveform when no cooling pulses were added, like the recording waveform H in FIG. 1. The recording waveform 10-2 is a waveform when radiation with the cooling power was applied immediately following the end of the recording pulse train, like the recording waveform I in FIG. 1. Here, the cooling power radiation time was varied in accordance with the mark length to be recorded, the cooling power radiation time being increased with decreasing mark length. Further, the recording waveform 10-3 is a waveform when radiation with bias power was applied following the end of the recording pulse train, and followed by radiation with the cooling power, like the recording waveform J in FIG. 1. Here, the cooling power radiation time was set to 0.50T, and the cooling power start time was varied in accordance with the mark length to be recorded, the start time being advanced with decreasing mark length.

As shown in Table 20, at the inner radius portion of the disk the recording waveform 10-1 has larger jitter than the other recording waveforms. On the other hand, in the case of the recording waveform 10-2, though an improvement in jitter is achieved at the inner radius portion of the disk when compared with the recording waveform 10-1, the jitter characteristic tends to deteriorate at the outer radius portion. In the case of the recording waveform 10-3 also, an improvement in jitter is achieved at the inner radius portion of the disk when compared with the recording waveform 10-1, but the jitter characteristic tends to deteriorate at the outer radius portion. This shows that, when recording on the inner portion of the disk inside a predetermined radius, for example, up to 43 mm radius, the recording waveform 10-2 or 10-3 should be used, and when recording on the disk portion outside that radius, the recording waveform 10-1 should be used.

In this way, by using the recording waveform 10-2 or 10-3 when recording on the inner radius portion of the disk, and the recording waveform 10-1 when recording on the outer radius portion, which is also advantageous in simplifying the recording circuitry, good jitter characteristics can be obtained at any radius portion of the disk.

Thus, in the case of a constant angular velocity optical disk, recording with small jitter can be achieved at any radius portion of the disk by increasing the cooling power radiation time or advancing the cooling power start time with decreasing mark length.

In the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used as the recording pulse train, but it should be noted that similar results were also obtained in the case of the recording pulse trains B, C, and D shown in FIG. 4.

Embodiment 11

An example will be described below in which a mark end portion correction pulse train as a cooling pulse was added immediately following the end of a recording pulse train.

In this embodiment, the recording pulse train A shown in FIG. 4 was used, and various mark end portion correction pulse trains were used, each added immediately following the end of the recording pulse train. The measuring conditions were the same as those used in the third embodiment.

Figure 6:
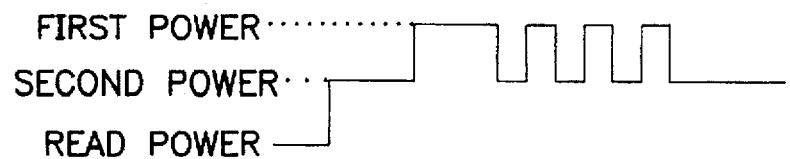
FIG. 6 is a diagram showing recording waveforms used in one embodiment of the present invention.
Figure 6:
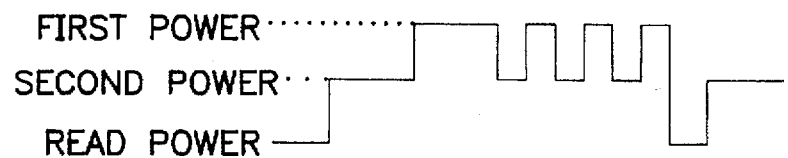
Figure 6:
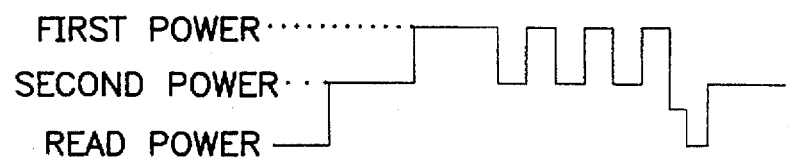
Figure 6:
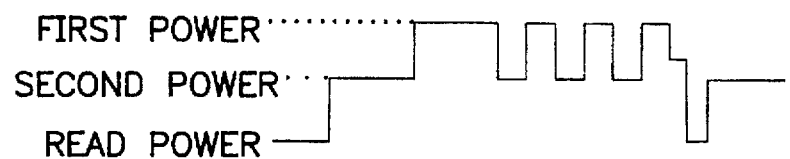
Figure 6:
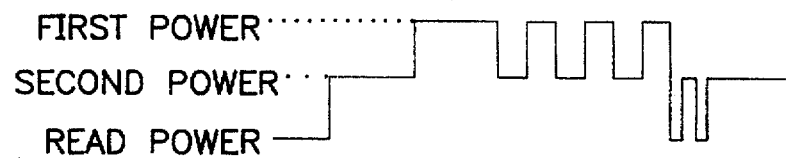
Figure 6:
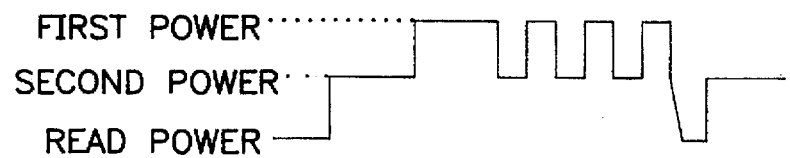
Figure 6:
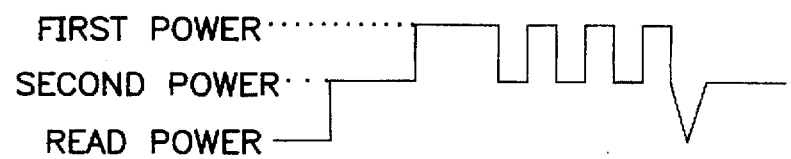

The various recording waveforms used in the present embodiment will be described with reference to FIG. 6. The waveforms shown in FIG. 6 show typical recording waveform patterns when recording a 6T mark.

The recording waveform 11-1 is a waveform when a mark end portion correction pulse train was not added.

The recording waveform 11-2 is a waveform when laser light with the read optical power was radiated for a period of 0.5T immediately following the end of the recording pulse train, after which laser radiation with the bias power was applied.

The recording waveform 11-3 is a waveform when laser light, with its power reduced to an intermediate level between the bias power and read optical power, was radiated for a period of 0.25T immediately following the end of the recording pulse train, the 0.25T period being immediately followed by a 0.25T period of laser radiation with the laser power reduced to the read optical power, thus adding a mark end portion correction pulse train, which was then followed by laser radiation with the bias power.

The recording waveform 11-4 is a waveform when laser light was radiated with a power 2 mW higher than the bias power for a period of 0.15T immediately following the end of the recording pulse train, the 0.15T period being immediately followed by a 0.35T period of laser radiation with the read optical power, thus adding a mark end portion correction pulse train, which was then followed by laser radiation with the bias power.

The recording waveform 11-5 is a waveform when laser light with the read optical power was radiated for a period of 0.2T immediately following the end of the recording pulse train, the 0.2T period being immediately followed by a 0.1T period of bias power radiation and then by a 0.2T period of laser radiation with the read optical power, thus adding a mark end portion correction pulse train, which was then followed by laser radiation with the bias power.

The recording waveform 11-6 is a waveform when laser power was reduced continuously from the bias power to the read optical power over a period of 0.2T immediately following the end of the recording pulse train, and then the laser light was retained at the read optical power for a period of 0.3T, thus adding a mark end portion correction pulse train, which was then followed by laser radiation with the bias power.

The recording waveform 11-7 is a waveform when laser power was reduced continuously from the bias power to the read optical power over a period of 0.25T immediately following the end of the recording pulse train, and then the laser light was continuously raised from the read optical power to the bias power, thus adding a mark end portion correction pulse train, which was then followed by laser radiation with the bias power.

The respective waveforms and the jitter values after 100 overwrites are shown in Table 21.

TABLE 21

| RECORDING WAVEFORM | JITTER |
|---|---|
| RECORDING WAVEFORM 11-1 | 11.6% |
| RECORDING WAVEFORM 11-2 | 9.6% |
| RECORDING WAVEFORM 11-3 | 7.8% |
| RECORDING WAVEFORM 11-4 | 8.4% |
| RECORDING WAVEFORM 11-5 | 8.7% |
| RECORDING WAVEFORM 11-6 | 8.0% |
| RECORDING WAVEFORM 11-7 | 8.4% |

As shown in Table 21, when laser radiation with the read power (or the cooling power) lower than the bias power is applied to add a recorded mark end portion correction pulse, as in the recording waveform 11-2, the jitter value after 100 overwrites improves when compared with the recording waveform 11-1.

On the other hand, in the case of the recording waveforms 11-3, 11-4, 11-5, 11-6, and 11-7 where a mark end portion correction pulse train was added in accordance with the present invention, a greater improvement in jitter is achieved than that achieved with the recording waveform 11-2, since the symmetry at the start and end portions of the mark is better controlled.

In this way, by adding a mark end portion correction pulse train immediately following the end of the recording pulse train, recording with good jitter characteristics after 100 overwrites can be achieved.

In the example shown in the present embodiment, laser power was varied in two steps to add the mark end portion correction pulse train, but it will be appreciated that similar results can also be obtained if the power is varied in three or more steps.

Furthermore, the present embodiment has shown an example where the read optical power was used as the cooling power, but it should be noted that similar results were also obtained when the cooling power was set larger than 0 but smaller than the bias power.

Moreover, in the example shown in the present embodiment, the second power in the recording pulse train was set equal to the bias power, but it should be noted that similar results were also obtained when the second power was set equal to or larger than 0 but smaller than the recording power.

Embodiment 12

Next, an example will be described in which laser radiation with the bias power was applied between a recording pulse train and a mark end portion correction pulse train.

In this embodiment, the recording pulse train A shown in FIG. 4 was used. The measuring conditions were the same as those used in the 11th embodiment.

Figure 7:
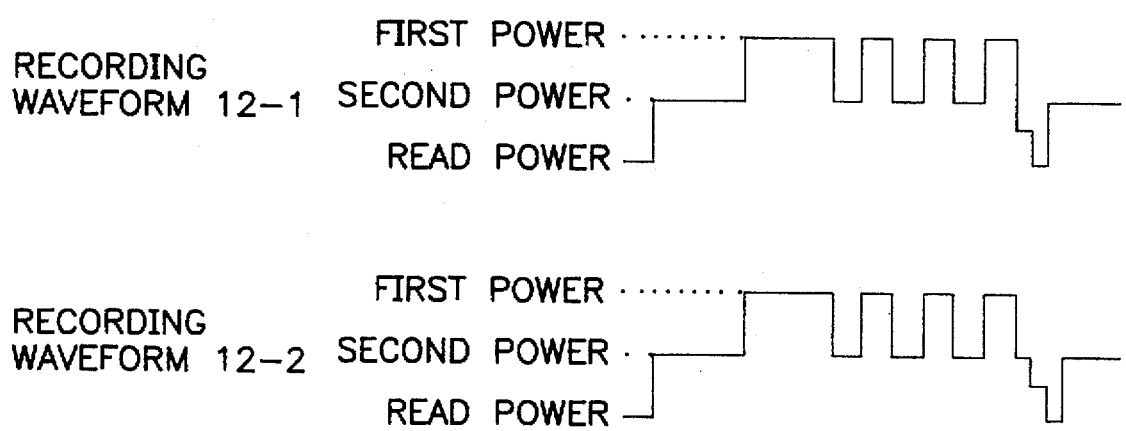
FIG. 7 is a diagram showing recording waveforms used in one embodiment of the present invention.

The recording waveforms used in this embodiment will be described with reference to FIG. 7. The waveforms in FIG. 7 show typical recording waveform patterns when recording a 6T mark.

The recording waveform 12-1 is the same as the recording waveform 11-3 in the 11th embodiment.

On the other hand, the recording waveform 12-2 is a waveform when laser radiation with the bias power was applied between the recording pulse train and mark end portion correction pulse train in accordance with the present invention; that is, laser light with the bias power was radiated for a period of 0.2T following the end of the recording pulse train, then the power was reduced to an intermediate level between the bias power and read power, at which level the laser light was radiated for a period of 0.25T, immediately followed by a 0.25T period of laser radiation with the laser power reduced to the read power, after which laser light with the bias power was radiated.

The respective recording waveforms and the jitter values after 100 overwrites are shown in Table 22.

TABLE 22

| RECORDING WAVEFORM | JITTER |
| --- | --- |
| RECORDING WAVEFORM 12-1 | 7.8% |
| RECORDING WAVEFORM 12-2 | 7.2% |

As shown in Table 22, in the case of the recording waveform 12-2 where laser radiation with the bias power was applied between the recording pulse train and mark end portion correction pulse train in accordance with the present invention, an improvement in jitter is achieved as compared with the recording waveform 12-1 because of improved symmetry between the start and end portions of the recorded mark.

In this way, by applying laser radiation with the bias power between the recording pulse train and mark end portion correction pulse train, recording with good jitter characteristics after 100 overwrites can be achieved.

In the example shown in the present embodiment, laser power was varied in two steps to add the mark end portion correction pulse train, but it will be appreciated that similar results can also be obtained if the power is varied in three or more steps, or if the laser power is continuously reduced below the bias power immediately following the end of the recording pulse train, during the application of the mark end portion correction pulse train.

Also, in the example shown in the present embodiment, the recording pulse train A in FIG. 4 was used as the recording pulse train, but it should be noted that similar results were also obtained in the case of the recording pulse trains B, C, and D shown in FIG. 4.

Furthermore, the present embodiment has shown an example where the read optical power was used as the cooling power, but it should be noted that similar results were also obtained when the cooling power was set larger than 0 but smaller than the bias power.

Moreover, in the example shown in the present embodiment, the second power in the recording pulse train was set equal to the bias power, but it should be noted that similar results were also obtained when the second power was set equal to or larger than 0 but smaller than the recording power.

Embodiment 13

Next, an example will be described in which a mark end portion correction pulse train was added to various recording pulse trains.

Figure 8:
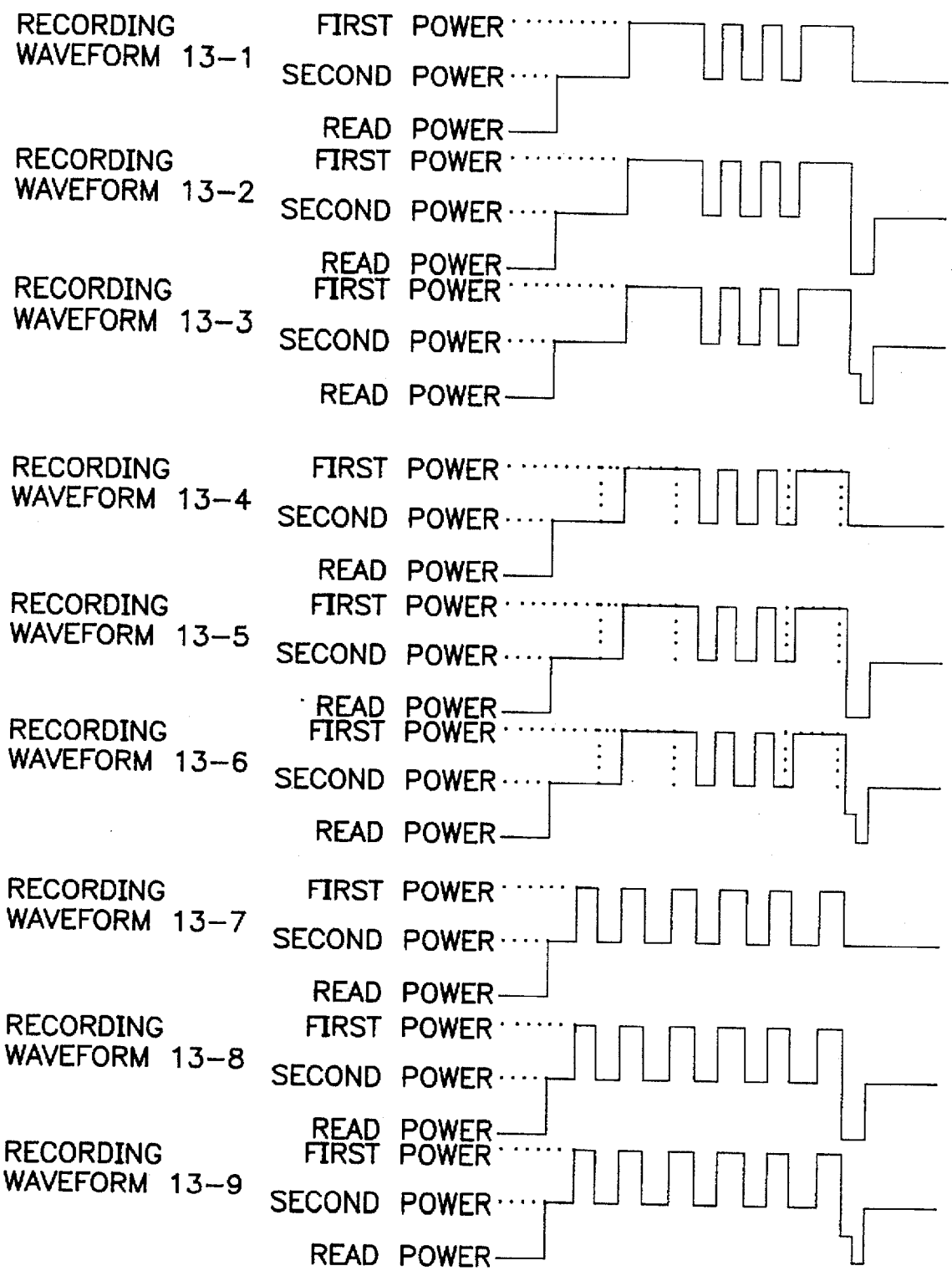
FIG. 8 is a diagram showing recording waveforms used in one embodiment of the present invention.

The recording waveforms used in this embodiment will be described with reference to FIG. 8. The waveforms in FIG. 8 show typical recording waveform patterns when recording a 6T mark.

The measuring conditions were the same as those used in the 11th embodiment.

The recording pulse train in the recording waveforms 13-1, 13-2, and 13-3 is the recording pulse train B shown in FIG. 4.

The recording waveform 13-1 is a waveform when a mark end portion correction pulse train was not added.

The recording waveform 13-2 is a waveform when laser light with the read optical power was radiated for a period of 0.5T immediately following the end of the recording pulse train, after which laser light with the bias power was radiated.

The recording waveform 13-3 is a waveform when laser light, with its power reduced to an intermediate level between the bias level and read optical power, was radiated for a period of 0.25T immediately following the end of the recording pulse train, the 0.25T period being immediately followed by a 0.25T period of laser radiation with the laser power reduced to the read optical power, thus adding a mark end portion correction pulse train, after which after which laser light with the bias power was radiated.

The recording pulse train in the recording waveforms 13-4, 13-5, and 13-6 is the recording pulse train C shown in FIG. 4.

The recording waveform 13-4 is a waveform when a mark end portion correction pulse train was not added.

The recording waveform 13-5 is a waveform when laser light with the read optical power was radiated for a period of 0.5T immediately following the end of the recording pulse train, after which laser light with the bias power was radiated.

The recording waveform 13-6 is a waveform when the same mark end portion correction pulse train as in the recording waveform 13-3 was added immediately following the end of the recording pulse train, after which laser light with the bias power was radiated.

The recording pulse train in the recording waveforms 13-7, 13-8, and 13-9 is the recording pulse train D shown in FIG. 4.

The recording waveform 13-7 is a waveform when a mark end portion correction pulse train was not added.

The recording waveform 13-8 is a waveform when laser light with the read optical power was radiated for a period of 0.5T immediately following the end of the recording pulse train, after which laser light with the bias power was radiated.

The recording waveform 13-9 is a waveform when the same mark end portion correction pulse train as in the recording waveform 13-3 was added immediately following the end of the recording pulse train, after which laser light with the bias power was radiated.

The respective waveforms and the jitter values after 100 overwrites are shown in Table 23.

TABLE 23

| RECORDING WAVEFORM | JITTER |
|---|---|
| RECORDING WAVEFORM 13-1 | 11.0% |
| RECORDING WAVEFORM 13-2 | 9.4% |
| RECORDING WAVEFORM 13-3 | 7.8% |
| RECORDING WAVEFORM 13-4 | 10.0% |
| RECORDING WAVEFORM 13-5 | 8.1% |
| RECORDING WAVEFORM 13-6 | 7.0% |
| RECORDING WAVEFORM 13-7 | 12.1% |
| RECORDING WAVEFORM 13-8 | 10.5% |
| RECORDING WAVEFORM 13-9 | 8.9% |

As shown in Table 23, when laser radiation with the read power is applied immediately following the end of the recording pulse train, as in the recording waveform 13-2, the jitter value after 100 overwrites improves as compared with the recording waveform 13-1.

On the other hand, in the case of the recording waveform 13-3 where the mark end portion correction pulse train was added in accordance with the present invention, the jitter is reduced compared with the recording waveform 13-2. In this way, for the recording pulse train B of FIG. 4 also, by adding the mark end portion correction pulse train an improvement in jitter can be achieved because of improved symmetry between the start and end portions of the recorded mark.

Likewise, in the case of the recording pulse trains C and D of FIG. 4 also, adding the mark end portion correction pulse train serves to improve the jitter characteristics because of improved symmetry between the start and end portions of the recorded mark.

In this way, by adding a mark end portion correction pulse train immediately following the end of the recording pulse trains B, C, and D shown in FIG. 4, recording with good jitter characteristics after 100 overwrites can be achieved.

In the example shown in the present embodiment, laser power was varied in two steps to add the mark end portion correction pulse train, but it will be appreciated that similar results can also be obtained if the power is varied in three or more steps, or if the laser power is continuously reduced below the bias power immediately following the end of the recording pulse train, during the application of the mark end portion correction pulse train.

Furthermore, the present embodiment has shown an example where the read optical power was used as the cooling power, but it should be noted that similar results were also obtained when the cooling power was set larger than 0 but smaller than the bias power.

Moreover, in the example shown in the present embodiment, the second power in the recording pulse train was set equal to the bias power, but it should be noted that similar results were also obtained when the second power was set equal to or larger than 0 but smaller than the recording power.

Embodiment 14

Next, an example will be described in which the start time of the mark end portion correction pulse train was varied in accordance with recorded mark length.

In this embodiment, the same measuring conditions as those in the 11th embodiment were used. In this embodiment also, the recording pulse train A shown in FIG. 4 was used.

The various recording waveforms used in the present embodiment will be described with reference to Table 24.

TABLE 24

| | START TIME OF MARK END PORTION CORRECTION PULSE TRAIN RELATIVE TO END OF RECORDING PULSE TRAIN | |
|---|---|---|
| MARK LENGTH | RECORDING WAVEFORM 14-1 | RECORDING WAVEFORM 14-2 |
| 3T | 0 T | 0 T |
| 4T | 0 T | 0.1 T |
| 5T | 0 T | 0.2 T |
| 6T | 0 T | 0.3 T |
| 7T | 0 T | 0.4 T |
| 8T | 0 T | 0.5 T |
| 9T | 0 T | 0.6 T |
| 10T | 0 T | 0.7 T |
| 11T | 0 T | 0.8 T |

The recording waveform 14-1 is a waveform when laser light with its power reduced to an intermediate level between the bias level and read optical power was radiated for a period of 0.25T, regardless of recorded mark length, immediately following the end of the recording pulse train, the 0.25T period being immediately followed by a 0.25T period of laser radiation with the power reduced to the read optical power, after which laser light with the bias power was radiated.

The recording waveform 14-2 is a waveform when the same mark end portion correction pulse train as in the recording waveform 14-1 was added, except that the time at which to start the application of the mark end portion correction pulse train was set to 0.8T when recording an 11T mark, the start time being advanced in increments of 0.1T as the mark length decreased, the mark end portion correction pulse train being added immediately following the end of the recording pulse train when recording a 3T mark, after which laser light with the bias power was radiated.

The respective waveforms and the jitter values after 100 overwrites are shown in Table 25.

TABLE 25

| RECORDING WAVEFORM | JITTER |
|---|---|
| RECORDING WAVEFORM 14-1 | 7.8% |
| RECORDING WAVEFORM 14-2 | 6.7% |

As shown in Table 25, in the case of the recording waveform 14-2 where the start time of the mark end portion correction pulse train was varied in accordance with the mark length, as in the present invention, an improvement in jitter is achieved for any mark length when compared with the recording waveform 14-1, because of improved symmetry between the start and end portions of the recorded mark.

In this way, by varying the start time of the mark end portion correction pulse train in accordance with the mark length to be recorded, recording with good jitter characteristics after 100 overwrites can be achieved.

In the example shown in the present embodiment, laser power was varied in two steps to add the mark end portion correction pulse train, but it will be appreciated that similar results can also be obtained if the power is varied in three or more steps, or if the laser power is continuously reduced below the bias power immediately following the end of the recording pulse train, during the application of the mark end portion correction pulse train.

Also, in the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used as the recording pulse train, but it should be noted that similar results were also obtained in the case of the recording pulse trains B, C, and D shown in FIG. 4.

Embodiment 15

Next, an example will be described in which the pulse shape of the mark end portion correction pulse train was varied in accordance with recorded mark length.

In this embodiment, the recording pulse train (the recording pulse train A shown in FIG. 4) was used. Also, the same measuring conditions were the same as those used in the 11th embodiment.

Figure 9:
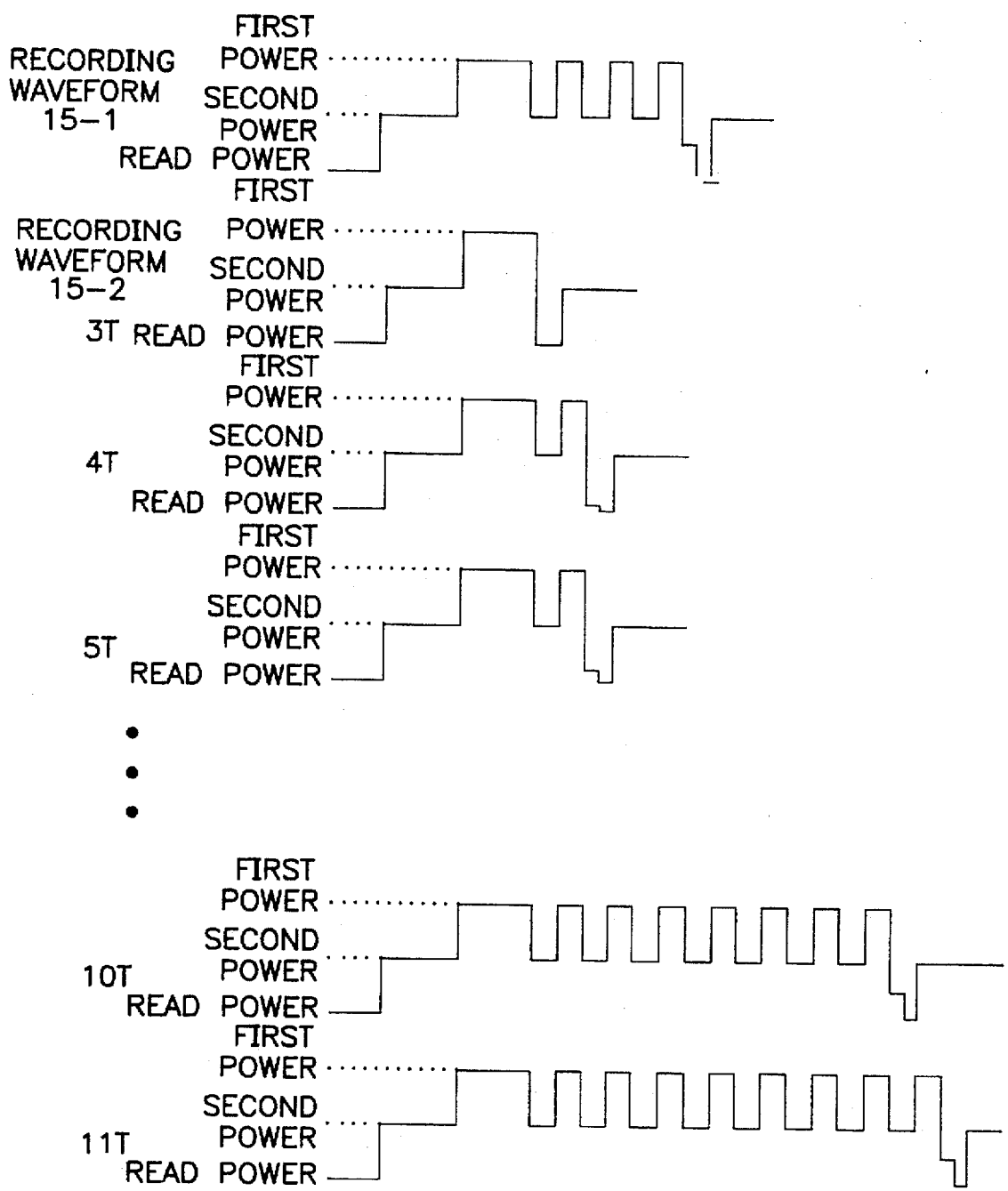
FIG. 9 is a diagram showing recording waveforms used in one embodiment of the present invention.

The various recording waveforms used in the present embodiment will be described with reference to FIG. 9. The recording waveform 15-1 in FIG. 9 shows a typical recording waveform pattern when recording a 6T mark. In the recording waveform 15-2 are shown recording waveform patterns only for 3T, 4T, 5T, 10T, and 11T out of the mark lengths 3T to 11T.

The recording waveform 15-1 is the same as the recording waveform 11-3 in the 11th embodiments.

The recording waveform 15-2 is a waveform when the power to be applied immediately after the end of the recording pulse train was varied in such a manner as to decrease with decreasing recorded mark length. More specifically, the power was set equal to the read optical power when recording a 3T mark, and then set higher than the read optical power by one-eighth of the difference between the bias power and the read optical power when recording a 4T mark, the power thus being increased incrementally with increasing mark length, and the power thus set was applied for a period of 0.25T, followed immediately by a 0.25T period of laser radiation with the power reduced to the read optical power, thus adding a mark end portion correction pulse train, after which laser light with the bias power was radiated.

The respective waveforms and the jitter values after 100 overwrites are shown in Table 26.

TABLE 26

| RECORDING WAVEFORM | JITTER |
|---|---|
| RECORDING WAVEFORM 15-1 | 7.8% |
| RECORDING WAVEFORM 15-2 | 6.4% |

As shown in Table 26, when the pulse shape of the mark end portion correction pulse train was varied in accordance with recorded mark length, as in the recording waveform 15-2 of the present invention, the jitter value after 100 cycles improves when compared with the recording waveform 15-1.

In this way, by varying the pulse shape of the mark end portion correction pulse train in accordance with the mark length to be recorded, symmetry between the start and end portions of the recorded mark improves and recording that ensures good read signal quality can be achieved.

In the example shown in the present embodiment, laser power was varied in two steps to add the mark end portion correction pulse train, but it will be appreciated that similar results can also be obtained if the power is varied in three or more steps, or if the laser power is continuously reduced below the bias power immediately following the end of the recording pulse train, during the application of the mark end portion correction pulse train.

Also, in the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used as the recording pulse train, but it should be noted that similar results were also obtained in the case of the recording pulse trains B, C, and D shown in FIG. 4.

Embodiment 16

Next, an example will be described in which, when an optical disk was rotated at a constant angular velocity, the start time of the mark end portion correction pulse train was varied in accordance with the radius position on the disk.

The rotational speed of the disk was set to 1000 rpm, and an EFM signal was recorded while varying clock T in accordance with disk radius in such a manner as to maintain the shortest mark length constantly at 0.90 μm.

In this embodiment, the same recording pulse train as used in the 11th embodiment (the recording pulse train A in FIG. 4) was used.

The recording waveforms used in the present embodiment will be described with reference to Table 27.

TABLE 27

| RECORDING WAVEFORM | START TIME OF MARK END PORTION CORRECTION PULSE TRAIN RELATIVE TO END OF RECORDING PULSE TRAIN | |
|---|---|---|
| 16-1 | | — |
| 16-2 | | 0 T |
| 16-3 | INNER RADIUS | 0 T |
| | INTERMEDIATE RADIUS | 0.2 T |
| | OUTER RADIUS | 0.5 T |

The recording waveform 16-1 is a waveform when a mark end portion correction pulse train was not added.

The recording waveform 16-2 is the same as the recording waveform 11-3 in the 11th embodiment.

The recording waveform 16-3 is a waveform when the same mark end portion correction pulse train as in the recording waveform 11-3 was added, but the time at which to start the application of the mark end portion correction pulse train was advanced as the disk radius portion moved inwards in accordance with the present invention. More specifically, for 23 to 34 mm radius, the mark end portion correction pulse train was added immediately following the end of the recording pulse train; for 35 to 46 mm radius, the start time of the mark end portion correction pulse train was delayed by 0.2T; and for 47 to 57 mm radius, the start time of the mark end portion correction pulse train was delayed by 0.5T.

The respective recording waveforms and the jitter values after 100 overwrites are shown in Table 28. The measurements were made at radius 26 mm for the inner radius portion, 38 mm for the intermediate radius portion, and 50 mm for the outer radius portion. The linear velocities at the respective radius positions were approximately 2.7, 4.0, and 5.2 m/s.

The other measuring conditions were the same as those used in the 11th embodiment.

TABLE 28

| RECORDING WAVEFORM | JITTER | | |
|---|---|---|---|
| | INNER RADIUS | INTERMEDIATE RADIUS | OUTER RADIUS |
| 16-1 | 13.5% | 11.6% | 11.4% |
| 16-2 | 9.0% | 7.8% | 9.3% |
| 16-3 | 9.0% | 6.7% | 8.0% |

As shown in Table 28, the recording waveform 16-1 has large jitter because of heat accumulation, but when the mark end portion correction pulse train was added, as in the recording waveform 16-2, the jitter value after 100 overwrites improves across the radius of the disk because of the elimination of heat accumulation.

On the other hand, in the case of the recording waveform 16-3 where the start time of the mark end portion correction pulse train was varied in accordance with the radius position on the disk, as in the present invention, a further improvement in jitter was observed because of improved heat control at the intermediate and outer radius portions.

In this way, by varying the start time of the mark end portion correction pulse train in accordance with the radius position on the disk, recording with good jitter characteristics after 100 overwrites can be achieved.

In the example shown in the present embodiment, laser power was varied in two steps to add the mark end portion correction pulse train, but it will be appreciated that similar results can also be obtained if the power is varied in three or more steps, or if the laser power is continuously reduced below the bias power immediately following the end of the recording pulse train, during the application of the mark end portion correction pulse train.

Also, in the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used as the recording pulse train, but it should be noted that similar results were also obtained in the case of the recording pulse trains B, C, and D shown in FIG. 4.

Embodiment 17

Next, an example will be described in which, when an optical disk was rotated at a constant angular velocity, the shape of the mark end portion correction pulse train was varied in accordance with the radius position on the disk.

In this embodiment, the same recording pulse train as used in the 11th embodiment (the recording pulse train A in FIG. 4) was used.

The measuring conditions were the same as those used in the 16th embodiment.

Figure 10:
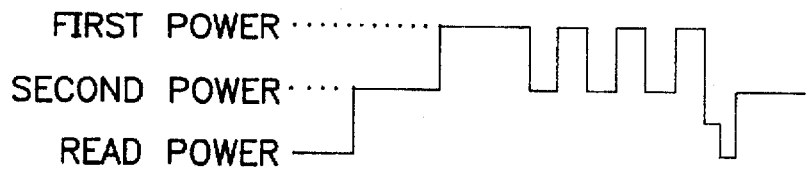
FIG. 10 is a diagram showing recording waveforms used in one embodiment of the present invention.
Figure 10:
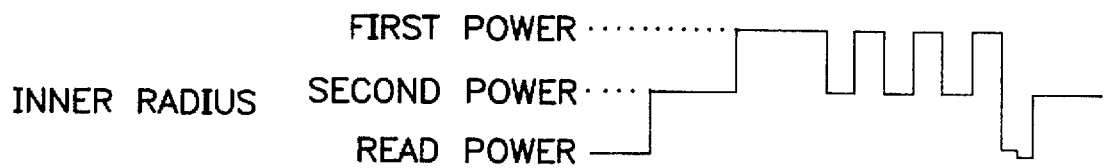
Figure 10:
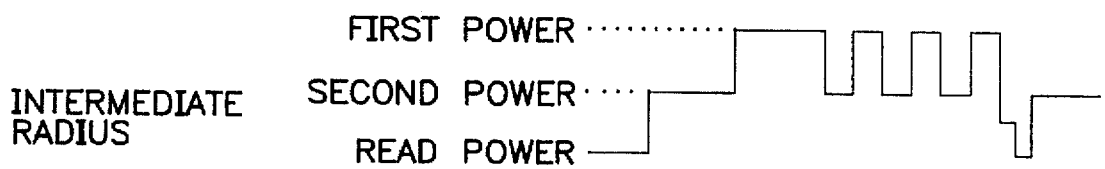
Figure 10:
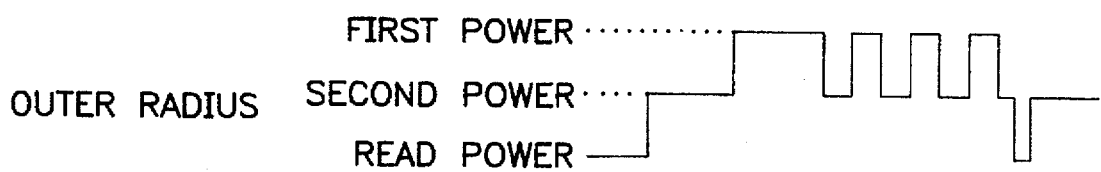

The recording waveforms used in the present embodiment will be described with reference to FIG. 10. Shown in FIG. 10 are typical recording pulse train patterns when recording a 6T mark. The recording waveform 17-2 shows recording waveform patterns for the inner, intermediate, and outer radius portions of the disk.

In the case of the recording waveform 17-1, the shape of the mark end portion correction pulse train remains the same regardless of the radius position on the disk, and the recording waveform itself is the same as the recording waveform 11-3 in the 11th embodiment.

The recording waveform 17-2 is a waveform when the power for adding the mark end portion correction pulse train immediately following the end of the recording pulse train was reduced as the disk radius portion moved inwards. More specifically, the power to be applied immediately following the end of the recording pulse train was set 1 mW higher than the read optical power for 23 to 24 mm radius, was set to an intermediate level between the bias power and the read optical power for 35 to 46 mm radius, and was set 1 mW lower than the bias power for 47 to 57 mm radius; the power thus set was applied for a period of 0.25T, followed immediately by a 0.25T period of laser radiation with the power reduced to the read optical power, thus adding a mark end portion correction pulse train, after which laser light with the bias power was radiated.

The respective waveforms and the jitter values after 100 overwrites are shown in Table 29.

TABLE 29

| RECORDING WAVEFORM | JITTER | | |
|---|---|---|---|
| | INNER RADIUS | INTERMEDIATE RADIUS | OUTER RADIUS |
| 17-1 | 9.0% | 7.8% | 9.3% |
| 17-2 | 8.1% | 7.8% | 7.9% |

As shown in Table 29, in the case of the recording waveform 17-2 where the power for adding the mark end portion correction pulse train immediately after the end of the recording pulse train was reduced as the disk radius portion moved inwards, as in the present invention, an improvement in jitter is achieved at both the inner and outer radius portions when compared with the recording waveform 17-1, because of improved symmetry between the start and end portions of the recorded mark.

In this way, by varying the shape of the mark end portion correction pulse train in accordance with the radius position on the disk, recording with good jitter characteristics after 100 overwrites can be achieved.

In the example shown in the present embodiment, laser power was varied in two steps to add the mark end portion correction pulse train, but it will be appreciated that similar results can also be obtained if the power is varied in three or more steps, or if the laser power is continuously reduced below the bias power immediately following the end of the recording pulse train, during the application of the mark end portion correction pulse train.

Also, in the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

Moreover, in the example shown in the present embodiment, the recording pulse train A in FIG. 4 was used as the recording pulse train, but it should be noted that similar results were also obtained in the case of the recording pulse trains B, C, and D shown in FIG. 4.

Embodiment 18

Figure 11:
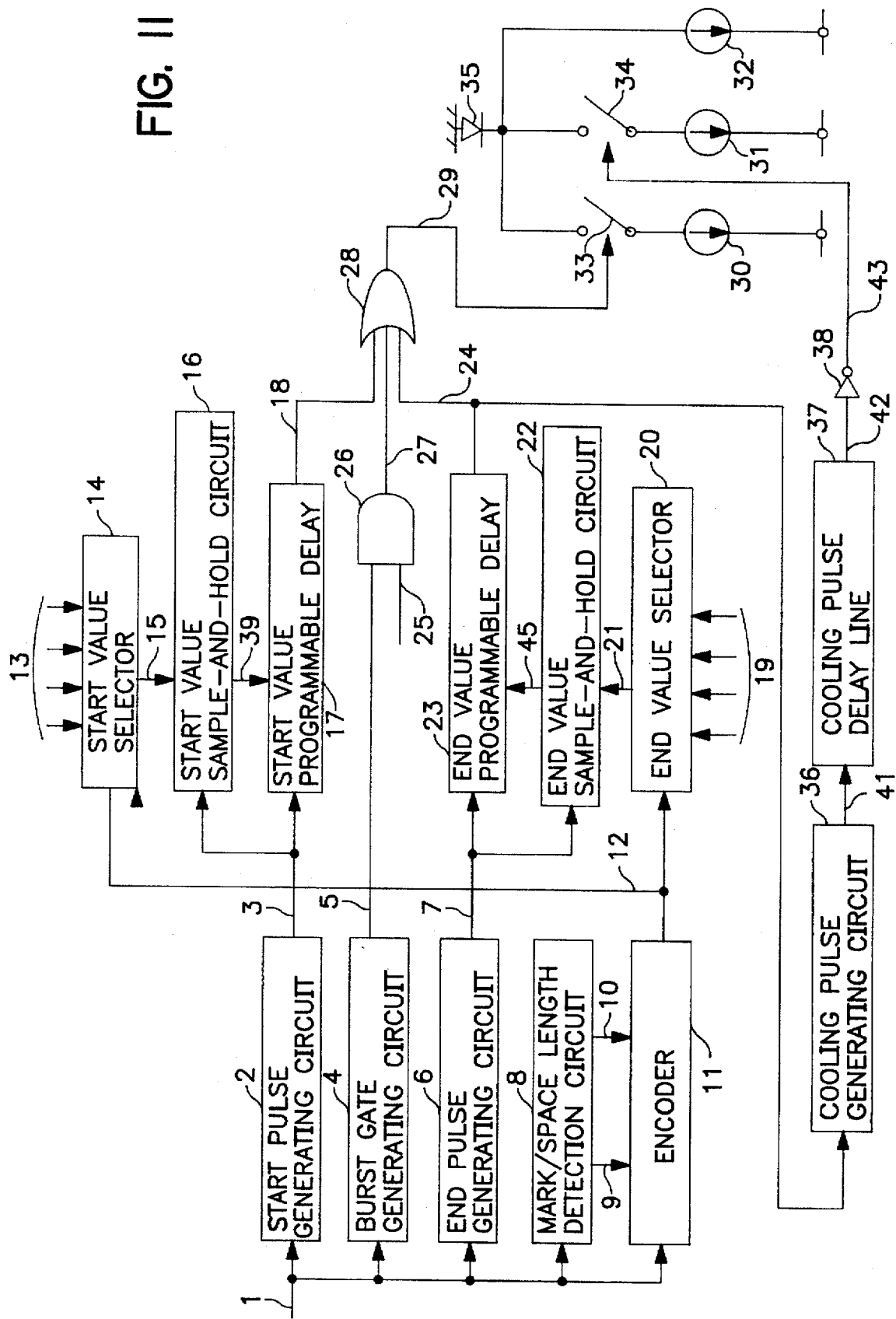
FIG. 11 is a block diagram of a disk recording apparatus used in one embodiment of the present invention.
Figure 12:
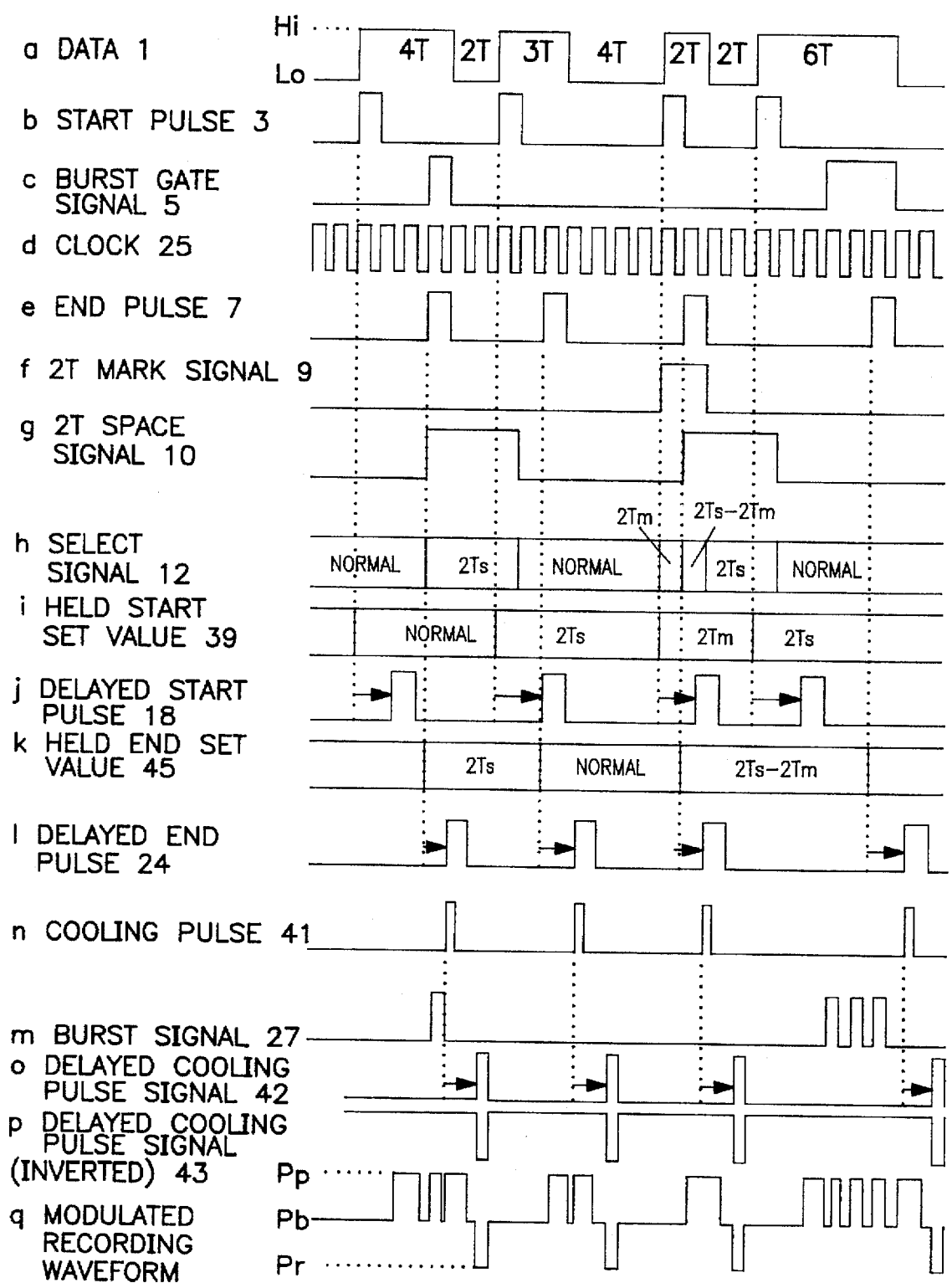
FIG. 12 is a diagram showing signal waveforms at various parts of the disk recording apparatus used in the same embodiment of the present invention.

First, of the various modes of the invention so far described, the operation of the mode where the time from the end pulse in the recording pulse train to the start of the laser radiation with the cooling power is fixed, will be explained with reference to the block diagram of a disk recording apparatus in FIG. 11 and the signal waveform diagrams shown in FIG. 12.

In this embodiment, data 1 is PWM data (FIG. 12a) having a Hi period and Lo period, each having a length equal to integral multiples of clock period and not smaller than two clock periods. The Hi period of the data corresponds to a mark and the Lo period corresponds to a space when recorded on the disk.

The duration of the start pulse 3 and end pulse 7 is set equal to one clock period, and the duration of one burst pulse 27 is set equal to one-half of the clock period.

Further, the cooling pulse duration is set equal to one-half of the clock period, and the time from the end pulse in the recording pulse train to the start of the laser radiation with the cooling power is also set equal to one-half of the clock period.

A mark/space length detection circuit 8 detects a space length that causes heat interference between marks in high-density recording and a mark/space length that causes a peak shift due to the frequency characteristics of the read system.

In the present embodiment, the shortest mark length 2T and shortest space length 2T contained in a data train to be recorded will be detected.

First, a start pulse generating circuit 2 generates a start pulse 3 of duration of one clock period at the start of the Hi period of data 1 (FIG. 12b).

A burst gate generating circuit 4 generates a burst gate signal 5, at the center of the mark, with a duration equal to the mark length minus three clock periods. When the mark length is equal to or shorter than three clock periods, the burst gate signal will not be generated (FIG. 12c).

An end pulse generating circuit 6 generates an end pulse 7 of duration of one clock period at the end of the Hi period of data 1 (FIG. 12e).

The mark/space length detection circuit 8 detects data of two-clock width, that is, a 2T mark and a 2T space, and when a 2T mark arrives, generates a 2T mark signal 9 of two-clock width in such a manner as to contain the start pulse and end pulse of the 2T mark (FIG. 12f), and when a 2T space arrives, generates a 2T space signal 10 of four-clock width in such a manner as to contain the end pulse and start pulse at both ends of the 2T space (FIG. 12g).

An encoder 11 determines the attribute of the start pulse 3 and end pulse 7 from the 2T mark signal 9 and 2T space signal 10, and outputs it as a select signal 12. More specifically, the select signal 12 classifies the mark/space into four attributes, that is, a mark of 3T or longer with a space of 3T or longer as normal, a mark of 3T or longer with a space of 2T as 2Ts, a mark of 2T with a space of 3T or longer as 2Tm, and a mark of 2T with a space of 2T as 2Ts-2Tm (FIG. 12h).

Next, based on the select signal 12, a start value selector 14 selects one value from among a plurality of start set values 13, that is, a start set value for normal, a start set value for 2Ts, a start set value for 2Tm, and a start set value for 2Ts-2Tm, and outputs the selected value as a selected start set value 15.

A start value sample-and-hold circuit 16 updates the value only when the start pulse 3 arrives, and holds the value until the next start pulse 3 arrives. The value thus held is output as a held start set value 39 (FIG. 12i).

The start pulse 3 is then delayed through a start value programmable delay line 17 by an amount of time based on the held start set value 39, and is output as a delayed start pulse 18 (FIG. 12j).

Similarly, an end value selector 20 selects one value from among a plurality of end set values 19 on the basis of the select signal 12, and outputs the selected value as a selected end set value 21. An end value sample-and-hold circuit 22 updates the value only when the end pulse 7 arrives, and holds the value until the next end pulse 7 arrives. The value thus held is output as a held end set value 45 (FIG. 12k).

The end pulse 7 is then delayed through an end value programmable delay line 23 by an amount of time based on the held end set value 45, and is output as a delayed end pulse 24 (FIG. 12l).

Here, a description will be given of how a delayed cooling pulse signal is output.

A cooling pulse generating circuit 36 generates a cooling pulse with a duration of one-half of the clock period at the rising edge of the delayed end pulse (FIG. 12n).

Next, the cooling pulse 41 output from the cooling pulse generating circuit 36 is delayed through a cooling pulse delay line 37 by a predetermined amount, and a cooling pulse signal 42 is output (FIG. 12o).

This signal is passed through an inverter 38, and output as a delayed cooling pulse signal 43 with Hi and Lo inverted (FIG. 12p).

Further, the burst gate signal 5 and clock 25 are ANDed by an AND gate 26, to generate a burst pulse 27 (FIG. 12m).

The delayed start pulse 18, the burst pulse 27, and the delayed end pulse 24 are ORed by an OR gate 28, to generate a recording signal 29.

A laser diode 35 is supplied with a bias from a read beam current source 32 and thus emits light of read optical power for a phase-change optical disk.

A bias level current source 31 and a recording level current source 30 are provided in parallel with the read beam current source 32. By turning on and off the currents from the recording level current source 30 and bias level current source 31 by means of respective switches 33 and 34, the drive current to the laser diode 35 can be switched between the three levels, i.e., the recording level current, bias level current, and read optical level current.

That is, by controlling the switch 33 using the recording signal 29, and the switch 34 using the delayed cooling pulse signal 43, the laser diode 35 can be driven to emit light with its power switched between the recording power, bias power, and cooling power. Using an optical head containing the laser diode 35, a mark and space with a cooling pulse added thereto is recorded on the phase-change optical disk (FIG. 12q).

Figure 13:
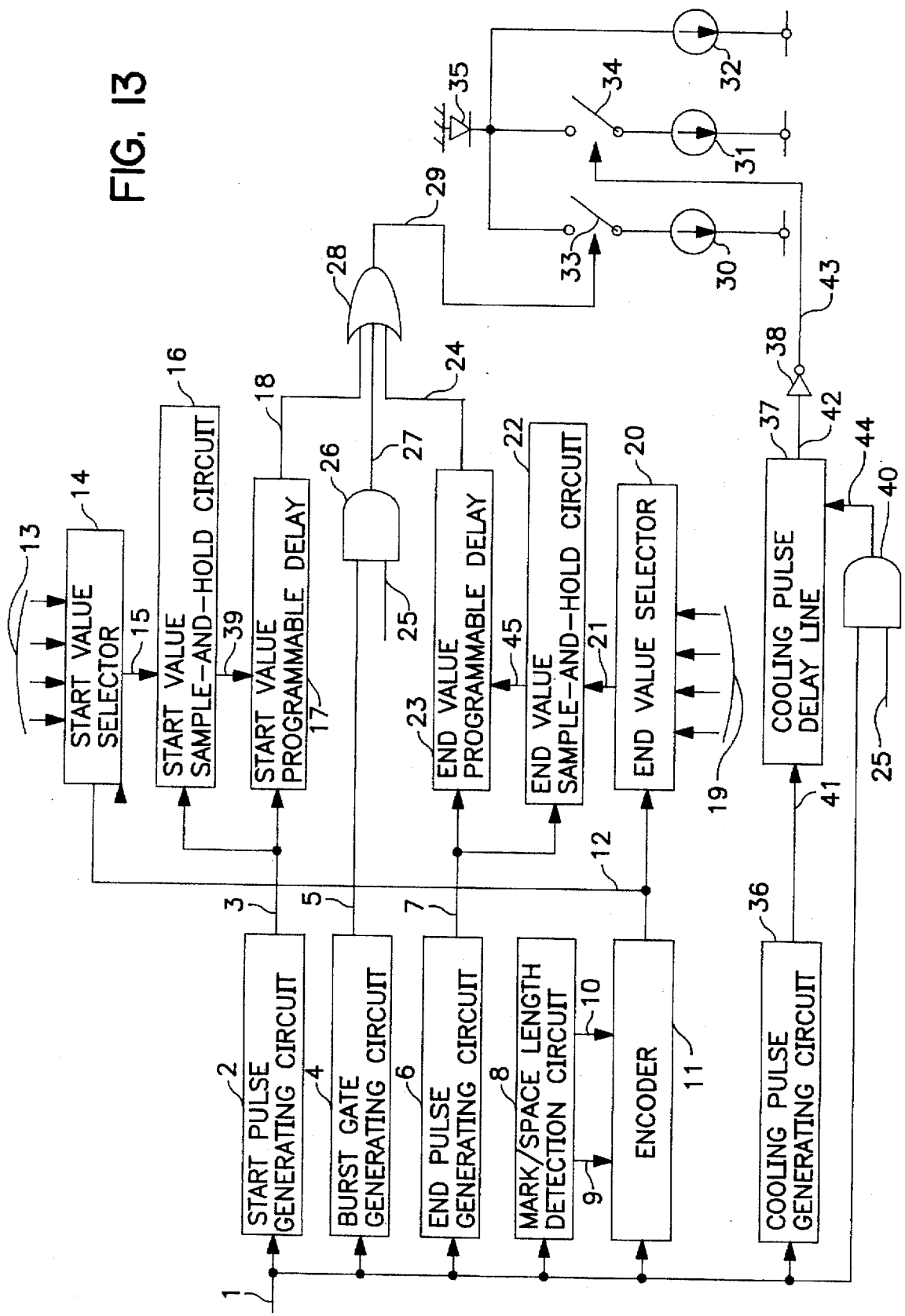
FIG. 13 is a block diagram of a disk recording apparatus used in one embodiment of the present invention.
Figure 14:
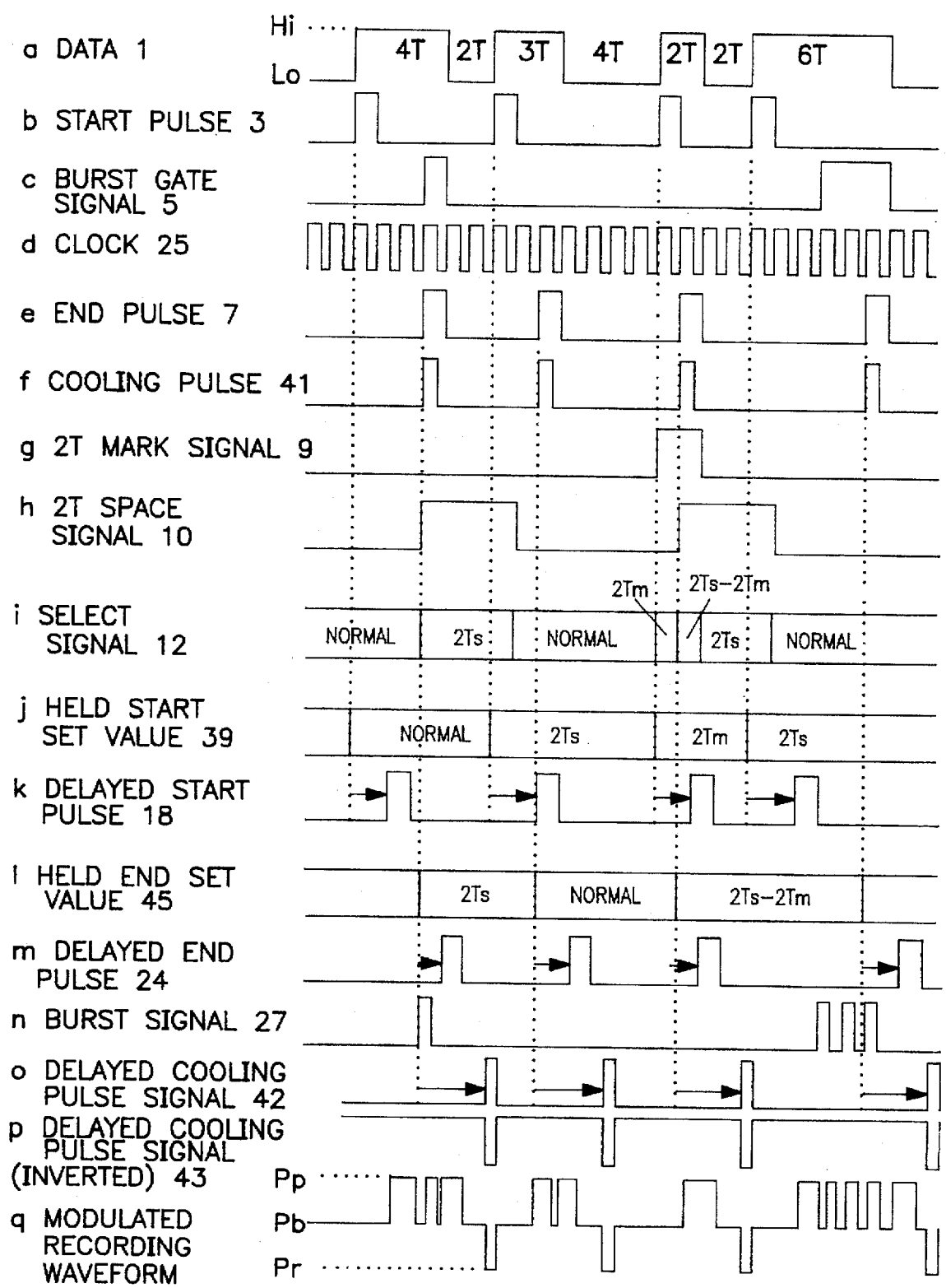
FIG. 14 is a diagram showing signal waveforms at various parts of the disk recording apparatus used in the same embodiment of the present invention.

Next, a method of creating the delayed cooling pulse signal, when the timing to start laser radiation with the cooling power is based on the clock, will be described with reference to the block diagram of a disk apparatus of FIG. 13 and the signal waveform diagrams shown in FIG. 14.

In the illustrated apparatus, the cooling pulse 41 is output from the cooling pulse generating circuit 36 in synchronism with the rising of the end pulse output from the end pulse generating circuit 6 (FIG. 14f).

The cooling pulse delay line 37 outputs a cooling pulse delayed by a predetermined amount (FIG. 14o).

In other respects, the operating principle is the same as described above.

With the above series of operations, the disk recording apparatus of the present embodiment can record marks and spaces corresponding to the data by adding laser radiation with the cooling power and by changing the start and end positions of the mark in accordance with the mark length to be recorded and with the space lengths before and after that mark length.

The present embodiment has assumed the use of a (1–7) RLL code recording signal, and the mark/space length detection circuit has been described as detecting the minimum transition spacing, 2T mark and 2T space, based on which the mark/space has been classified into four patterns using combinations of marks and spaces of 2T and longer. However, by further classifying marks and spaces of 3T and longer, the edge position accuracy of each mark can be enhanced.

Further, the start and end pulses have each been specified as 1T duration, and the burst pulse as 0.5T duration. However, it is also possible to select optimum pulse duration based, for example, on relative velocity between beam spot and thin recording film or recording medium.

Also, the cooling pulse duration has been fixed to a predetermined value of 0.5T, but total energy can be further reduced by varying the duration in accordance with mark length or mark spacing.

An optical disk was evaluated using the following conditions. Laser light with a 680-nm wavelength was used, and the objective lens of the optical head used for recording and read in the recording apparatus was chosen to have an NA of 0.55; with these conditions, a (1–7) RLL signal was recorded with clock T so set as to provide the shortest mark length of 0.60 μm, and the jitter values, σ sum/Tw (%), at the zero cross points of the read signals of 2T to 8T were measured. Here, σ sum is the standard deviation of the sum of the jitters from 2T to 8T, and Tw is the window width of the detection system. A linear velocity of 4.0 m/s was used.

In recording the signal on this disk, the power where C/N saturates when a single frequency forming a recorded mark length of 0.6 μm was recorded was set as the recording power, and power of a center value of the power margin where erasure ratio exceeds −20 dB when the signal of the 2T mark was overwritten with a single frequency equivalent to 7T was set as the bias power.

The cycle characteristic of the disk was evaluated based on the number of cycles that satisfied the condition dictating that the jitter values, σ sum/Tw (%), at the zero cross points of the read signals from 2T to 8T be less than 13%.

Figure 15:
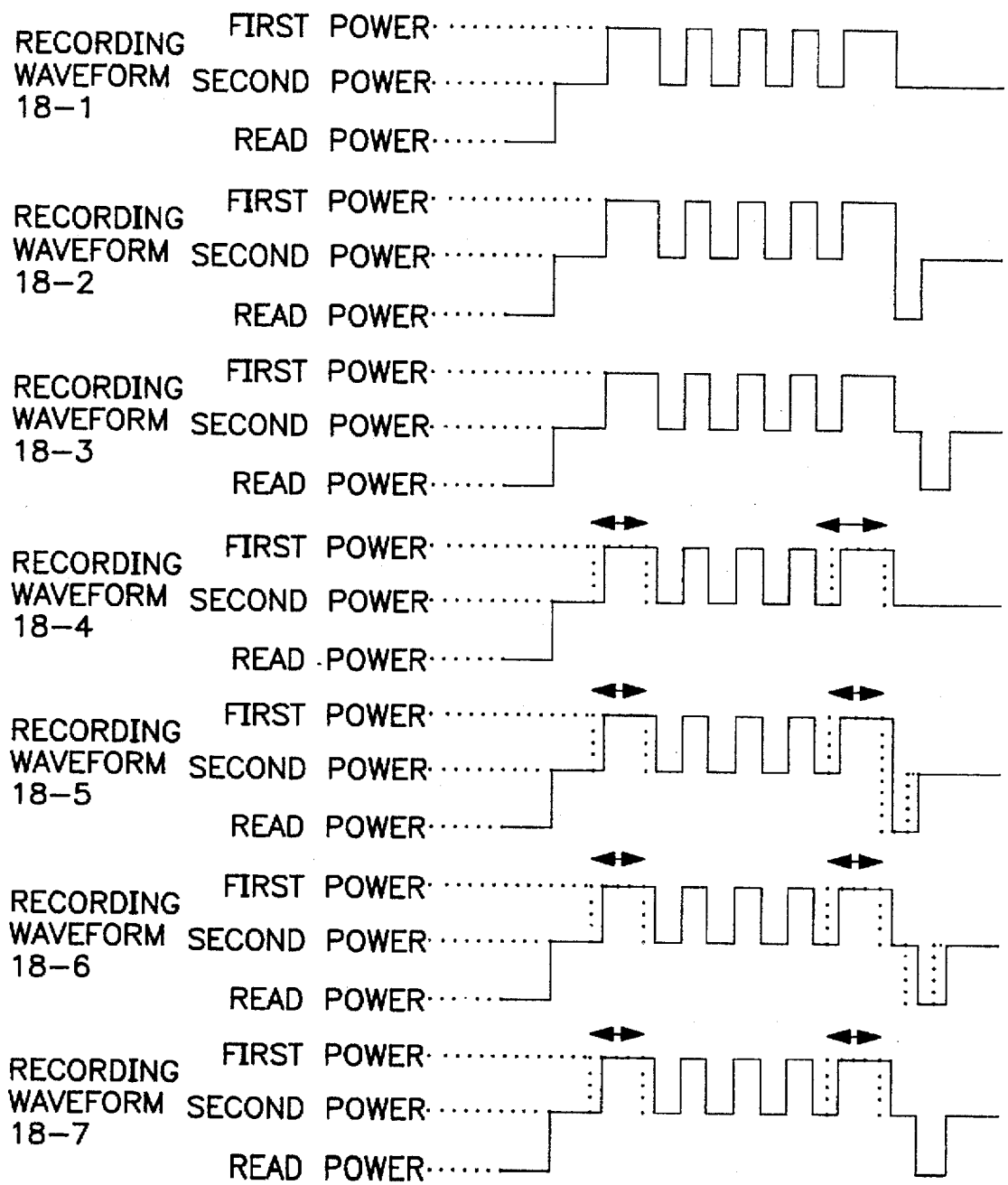
FIG. 15 is a diagram showing recording waveforms used in the same embodiment of the present invention.

The recording waveforms used in the present embodiment will be described with reference to FIG. 15. The waveforms in FIG. 15 show typical recording waveform patterns when recording a 7T mark. The recording pulse train B shown in FIG. 4 was used in the recording waveforms 18-1 to 18-3, and the recording pulse train C shown in FIG. 4 was used in the recording waveforms 18-4 to 18-7.

The recording waveform 18-1 is a recording pulse train which consists of a start pulse of 1.0T duration, an end pulse of 1.0T duration, and intermediate pulses formed by alternating the laser power between the second power and the first power at intervals of 0.5T, and which does not accompany a cooling pulse.

The recording waveform 18-2 is fundamentally the same as the recording waveform 18-1, except that a cooling pulse was applied with a cooling power of 0.5T duration immediately following the end pulse in the recording pulse train, regardless of the mark length to be recorded.

The recording waveform 18-3 is fundamentally the same as the recording waveform 18-1, except that a cooling pulse was applied with a cooling power of 0.5T duration, the time from the falling of the end pulse in the recording pulse train to the start of the laser radiation of the cooling power being fixed to 0.5T, regardless of the mark length to be recorded.

The recording waveform 18-4 is fundamentally the same as the recording waveform 18-1, except that the start and end pulse positions of the recording pulse train were changed in accordance with the mark length to be recorded and with the mark spacings before and after the mark. No cooling pulses were added.

The recording waveform 18-5 is fundamentally the same as the recording waveform 18-4, except that a cooling pulse was applied with a cooling power of 0.5T duration immediately following the end pulse of the recording pulse train, regardless of the mark length to be recorded.

The recording waveform 18-6 is fundamentally the same as the recording waveform 18-4, except that a cooling pulse was applied with a cooling power of 0.5T duration, the time from the rising of the end pulse in the recording pulse train to the start of the laser radiation with the cooling power being fixed to 1.5T, regardless of the mark length to be recorded.

The recording waveform 18-7 is fundamentally the same as the recording waveform 18-4, except that a cooling pulse was applied with a cooling power of 0.5T duration, the application of the cooling power being delayed by a fixed period of 2.5T from the rising of the end pulse in a sub pulse train (consisting of pulses between the start and end pulses), regardless of the mark length to be recorded. That is, the cooling pulse radiation start time was determined based on the clock.

The respective recording waveforms, the jitter values after 100 cycles, and the number of cycles that satisfies the jitter value less than 13% are shown in Table 30.

TABLE 30

| RECORDING WAVEFORM | JITTER AFTER 100 CYCLES | NUMBER OF CYCLES SATISFYING JITTER < 13% |
|---|---|---|
| 18-1 | 10.3% | 30 × 10⁴ |
| 18-2 | 9.0% | 80 × 10⁴ |
| 18-3 | 7.5% | 80 × 10⁴ |
| 18-4 | 7.3% | 50 × 10⁴ |
| 18-5 | 6.9% | 100 × 10⁴ |
| 18-6 | 6.3% | 110 × 10⁴ |
| 18-7 | 6.4% | 110 × 10⁴ |

As shown in Table 30, in the case of the recording waveform 18-2 where a cooling pulse was added in accordance with the present invention, the number of cycles that satisfies the jitter <13% is improved because of reduced thermal damage when compared with the recording waveform 18-1 where no cooling pulses were added.

When laser radiation with the bias power of 0.5T was applied immediately following the end of the recording pulse train, as in the recording waveform 18-3, jitter is reduced because of improved symmetry between the start and end portions of the recorded mark as compared with the recording waveform 18-2.

Furthermore, in the case of the waveforms where the start and end pulse positions of the recording pulse train were varied in accordance with the mark length to be recorded and with the mark spacings before and after the mark, when a cooling pulse was added in accordance with the present invention, as in the recording waveform 18-5, the number of cycles that satisfies the jitter <13% is improved because of reduced thermal damage when compared with the recording waveform 18-4 where no cooling pulses were added.

It should also be noted that when the start and end pulse positions of the recording pulse train were varied in accordance with the mark length to be recorded and the mark spacings before and after the mark, jitter is reduced since the mark shape can be controlled better than when no such processing was made.

Moreover, by applying laser radiation with the bias power between the end pulse in the recording pulse train and the laser radiation with the cooling power, as in the recording waveforms 18-6 and 18-7 of the present invention, not only the jitter value after 100 cycles but also the number of cycles that satisfies the jitter <13% is improved further, providing better values than the recording waveform 18-5 where laser radiation with the cooling power was applied immediately following the end of the recording pulse train.

In this way, by applying laser radiation with the bias power between the end pulse of the recording pulse train and the laser radiation with the cooling power, recording with good jitter characteristics after 100 cycles and many overwrite cycles can be achieved.

In the example shown in the present embodiment, the read optical power was used as the cooling power, but it should be noted that similar results were also obtained when the cooling power was set larger than 0 but smaller than the bias power.

Furthermore, the present embodiment has shown an example where the second power in the recording pulse train was set equal to the bias power, but it should be noted that similar results were also obtained when the second power was set equal to or larger than 0 but smaller than the recording power.

According to the recording method of the present invention, since mark length variations due to heat interference between recorded marks are suppressed and the symmetry between the start and end portions of the recorded mark is improved, the recorded mark can be formed in the desired shape, and an improvement in read signal quality can be achieved not only in the case of an increased density optical disk but also when the disk rotation method is constant angular velocity. Furthermore, good cycle characteristics can be achieved by reducing signal degradation due to thermal damage when overwrite cycles are repeated many times.

What is claimed is:

1. An optical information recording method by which a modulated signal is recorded, by switching laser light between a plurality of powers on an optical recording medium having a thin recording film that exhibits a reversible change between optically recognizable states, comprising the steps of:

modulating said laser light between a preset first power having power equal to or higher than a recording power used for recording on said thin recording film, and a preset second power having power lower than said first power, to form a recorded mark using a recording pulse train, applying a cooling pulse after said recording pulse train, said cooling pulse having a cooling power lower than a bias power which is set lower than said recording power, and varying said laser light power during a period starting from the moment an end pulse in said recording pulse train begins to fall until said cooling power is reached.

2. An optical information recording method according to claim 1, wherein the step of varying the laser light power includes one of varying the laser light power incrementally and varying the laser light power continuously.

3. An optical information recording method according to claim 1, wherein said preset first power is applied at the start portion of said recording pulse train and, for portions other than the start portion of said recording pulse train, said laser light is switched alternately between said first power and said second power at intervals of time equal to or shorter than one data clock period.

4. An optical information recording method according to claim 1, wherein said laser light is switched alternately between said first power and said second power at intervals of time equal to or shorter than one data clock period.

5. An optical information recording method according to claim 1, wherein said preset first power is applied at the start and end portions of said recording pulse train and, for portions between the start and end pulses in said recording pulse train, said laser light is switched alternately between said first power and said second power at intervals of time equal to or shorter than one data clock period.

6. An optical information recording method according to claim 1, wherein said preset first power is applied at the start and end portions of said recording pulse train and, for portions between the start and end pulses in said recording pulse train, said laser light is switched alternately between said first power and said second power at intervals of time equal to or shorter than one data clock period, and the start and end portions of said recording pulse train are displaced in position in accordance with recorded mark length and recorded mark spacing.

7. An optical information recording method according to claim 6, further comprising the step of:

applying laser radiation with said bias power between said recording pulse train and laser radiation with said cooling power, wherein the time from the start of laser radiation at the end pulse of said recording pulse train to the start of the laser radiation with said cooling power is fixed.

8. An optical information recording method according to claim 6, wherein timing to start the laser radiation with said cooling power is based on a clock.

9. An optical information recording method by which a modulated signal is recorded, by switching laser light between a plurality of powers on an optical recording medium having a thin recording film that exhibits a reversible change between optically recognizable states, comprising the steps of:

modulating said laser light between a preset first power having power equal to or higher than a recording power used for recording on said thin recording film, and a preset second power having power lower than said first power, to form a recorded mark using a recording pulse train, applying a cooling pulse after said recording pulse train, said cooling pulse having a cooling power lower than a bias power which is set lower than said recording power, and driving said optical recording medium for rotation with a constant angular velocity, wherein in an area of said optical recording medium at least inside a designated radius, at least one of the start time of laser radiation with said cooling power relative to the end of said recording pulse train is advanced and the duration of laser radiation with said cooling power is extended when said recorded mark is shorter than a predetermined length.

10. An optical information recording method by which a modulated signal is recorded, by switching laser light between a plurality of powers on an optical recording medium having a thin recording film that exhibits a reversible change between optically recognizable states, comprising the steps of:

modulating said laser light between a preset first power having power equal to or higher than a recording power used for recording on said thin recording film, and a preset second power having power lower than said first power, to form a recorded mark using a recording pulse train, applying a cooling pulse after said recording pulse train, said cooling pulse having a cooling power lower than a bias power which is set lower than said recording power, driving said optical recording medium for rotation with a constant angular velocity, and setting the start time of laser radiation with said cooling power relative to the end of laser radiation with said recording power and the duration of laser radiation with said cooling power to a predetermined value only when said recorded mark is not longer than a predetermined length, wherein in an area of said optical recording medium at least inside a designated radius, laser radiation with said cooling power is applied only when said recorded mark is not longer than the predetermined length.

11. An optical information recording method according to claim 10, wherein laser radiation with said cooling power is applied only when said recorded mark is of a minimum length.

12. An optical information recording method by which a modulated signal is recorded, by switching laser light between a plurality of powers on an optical recording medium having a thin recording film that exhibits a reversible change between optically recognizable states, comprising the steps of:

modulating said laser light between a preset first power having power equal to or higher than a recording power used for recording on said thin recording film, and a preset second power using power lower than said first power, to form a recorded mark using a recording pulse train, and applying a cooling pulse train immediately after said recording pulse train, said cooling pulse train having pulses formed with laser light having at least two different powers each lower than said first power, at least one pulse in said cooling pulse train being formed with a power lower than a bias power.

13. An optical information recording method according to claim 12, wherein when said optical recording medium is rotated at a constant angular velocity, at least one of the start time of the cooling pulse application and the pulse shape of said cooling pulse is varied in accordance with a radius position on said optical recording medium.

14. An optical information recording method according to claim 12, wherein said cooling pulse is formed with a preset third power and a preset fourth power of laser light, said third power being set higher than said fourth power and lower than one of said second power and said bias power, and further comprising the steps of:

applying laser radiation with said third power immediately following said recording pulse train, and applying laser radiation with said fourth power immediately following said laser radiation with said third power.

15. An optical information recording method according to claim 12, wherein said cooling pulse is formed with a preset fifth power and a preset sixth power of laser light, said fifth power being set higher than said bias power and said sixth power set lower than said bias power, and further comprising the steps of:

applying laser radiation with said fifth power immediately following said recording pulse train, and applying laser radiation with said sixth power immediately following said laser radiation with said fifth power.

16. An optical information recording method according to claim 12, wherein said cooling pulse is formed with a preset seventh power, a preset eighth power, and a preset ninth power of laser light, said seventh power and said ninth power both being set lower than said eighth power and lower than one of said second power and said bias power, and further comprising the steps of:

applying laser radiation with said seventh power immediately following said recording pulse train, applying laser radiation with said eighth power, and applying laser radiation with said ninth power.

17. An optical information recording method according to claim 12, wherein at least one of the start time of the cooling pulse application and the pulse shape of said cooling pulse is varied in accordance with recorded mark length.

18. An optical information recording method according to claim 12, further comprising the step of applying laser radiation with one of said second power and one of said bias power between said recording pulse train and said cooling pulse.

19. An optical information recording method by which a modulated signal is recorded, by switching laser light between a plurality of powers on an optical recording medium having a thin recording film that exhibits a reversible change between optically recognizable states, comprising the steps of:

modulating said laser light between a preset first power having power equal to or higher than a recording power used for recording on said thin recording film, and a preset second power having power lower than said first power, to form a recorded mark using a recording pulse train, applying a cooling pulse after said recording pulse train, said cooling pulse having a cooling power lower than a bias power which is set lower than said recording power, and varying at least one of the start time of laser radiation with said cooling power relative to the end of said recording pulse train and the duration of laser radiation with said cooling power in accordance with the length of said recorded mark.

20. An optical information recording method according to claim 19, wherein the duration of laser radiation with said cooling power is made longer when recording a short mark than when recording a long mark.

21. An optical information recording method according to claim 19, wherein laser radiation with said cooling power is started earlier when recording a short mark than when recording a long mark.

22. An optical information recording method by which a modulated signal is recorded, by switching laser light between a plurality of powers on an optical recording medium having a thin recording film that exhibits a reversible change between optically recognizable states, comprising the steps of:

modulating said laser light between a preset first power having power equal to or higher than a recording power used for recording on said thin recording film, and a preset second power having power lower than said first power, to form a recorded mark using a recording pulse train, applying a cooling pulse after said recording pulse train, said cooling pulse having a cooling power lower than a bias power which is set lower than said recording power, and varying at least one of the start time of laser radiation with said cooling power relative to the end of said recording pulse train and the duration of laser radiation with said cooling power only when said recorded mark is not longer than a predetermined length.

23. An optical information recording method comprising the steps of:

forming a recorded mark by laser radiation with a recording pulse train having a plurality of pulses modulating laser light between a preset first power and a preset second power, applying said preset first power at start and end portions of said recording pulse train when said first power of said laser light is higher than said second power, switching said laser light alternately between said first power and said second power at intervals of time equal to or shorter than one data clock period for portions between the start and end pulses in said recording pulse train, and applying laser radiation immediately following said recording pulse train, the laser radiation having a cooling power lower than a bias power which is set lower than a recording power.

24. An optical information recording method according to claim 23, wherein the start and end portions of said recording pulse train are displaced in position in accordance with recorded mark length and recorded mark spacing.

25. An optical information recording method by which a modulated signal is recorded, by switching laser light between a plurality of powers on an optical recording medium having a thin recording film that exhibits a reversible change between optically recognizable states, comprising the steps of:

modulating said laser light between a preset first power having power equal to or higher than a recording power used for recording on said thin recording film, and a preset second power having power lower than said first power, to form a recorded mark using a recording pulse train, applying a cooling pulse after said recording pulse train, said cooling pulse having a cooling power lower than a bias power which is set lower than said recording power, applying laser radiation with said bias power during a period between said recording pulse train and laser radiation with said cooling power, setting the start time of laser radiation with said cooling power relative to the end of said recording pulse train and the duration of laser radiation with said cooling power to a predetermined value, and applying laser radiation with said cooling power only when said recorded mark is not longer than a predetermined length.

26. An optical information recording method according to claim 25, wherein laser radiation with said cooling power is applied only when said recorded mark is of a minimum length.

27. An optical information recording method by which a modulated signal is recorded, by switching laser light between a plurality of powers on an optical recording medium having a thin recording film that exhibits a reversible change between optically recognizable states, comprising the steps of:

modulating said laser light between a preset first power having power equal to or higher than a recording power used for recording on said thin recording film, and a preset second power having power lower than said first power, to form a recorded mark using a recording pulse train, and applying a cooling pulse immediately after said recording pulse train, said cooling pulse containing a period during which said laser light is continuously varied immediately following said recording pulse train, until reaching a power lower than either said second power or a bias power.

28. An optical information recording method according to claim 27, wherein said cooling pulse contains a period during which said laser light is continuously varied immediately following said recording pulse train, until reaching a power lower than one of said second power and said bias power, and a period during which said laser light power is continuously varied from the power lower than one of said second power and said bias power, until reaching said one of said second power and said bias power.

29. A disk recording apparatus for recording optical information on a disk with a Hi period of data as a mark and a Lo period of data as a space, comprising:

a start pulse generating circuit for generating a start pulse of prescribed duration at a start position of the Hi period of data;

a burst gate generating circuit for generating a burst gate signal at a middle position of the mark when the Hi period of data is long, and for not generating a burst gate signal when the Hi period of data is short;

an end pulse generating circuit for generating an end pulse of prescribed duration at an end position of the Hi period of data;

a mark/space length detection circuit for generating an nT mark signal in such a manner as to contain said start pulse and said end pulse when the Hi period of data is n clocks long, and for generating an mT space signal in such a manner as to contain said end pulse and said start pulse at both ends of the space when the Lo period of data is m clocks long (where n and m are natural numbers existing in data train);

an encoder for generating a select signal for controlling a start value selector and an end value selector (described hereinafter) from said nT mark signal and said mT space signal;

a cooling pulse generating circuit for generating a cooling pulse of prescribed duration from a delayed end pulse output from an end value programmable delay line hereinafter described;

a start value selector for selecting one value from among a plurality of start set values in accordance with said select signal, and for outputting the thus selected start set value;

a start value sample-and-hold circuit for updating the start set value supplied from said start value selector only when said start pulse has arrived, and for holding a previous value otherwise;

a start value programmable delay line for delaying said start pulse by varying an amount of delay in accordance with the start set value output from said start value sample-and-hold circuit, and for outputting the thus delayed start pulse;

an end value selector for selecting one value from among a plurality of end set values in accordance with said select signal, and for outputting the thus selected end set value;

an end value sample-and-hold circuit for updating the end set value supplied from said end value selector only when said end pulse has arrived, and for holding a previous value otherwise;

an end value programmable delay line for delaying said end pulse by varying an amount of delay in accordance with the end set value output from said end value sample-and-hold circuit, and for outputting the thus delayed end pulse;

a cooling pulse delay line for outputting a delayed cooling pulse by varying an amount of delay to be introduced in said cooling pulse;

an AND gate for ANDing said burst gate signal and clock, and thereby outputting a burst pulse;

an OR gate for ORing said delayed start pulse, said burst pulse, and said delayed end pulse, and thereby outputting a recording signal;

an inverter for inverting the cooling pulse signal output from said cooling pulse delay line;

a bias current source for supplying a bias current to a laser diode hereinafter described;

a recording current source, connected in parallel with said bias current source, for supplying a recording current to the laser diode hereinafter described;

a read beam current source, connected in parallel with said bias current source, for supplying a read beam current to the laser diode hereinafter described;

a switch for turning on and off the current from said recording current source in accordance with said recording signal;

a switch for turning on and off the current from said bias current source in accordance with said cooling pulse signal; and a laser diode for recording a disk signal driven by said bias current source, said recording current source, and said read beam current source in parallel.

30. A disk recording apparatus for recording optical information on a disk with a Hi period of data as a mark and a Lo period of data as a space, comprising:

a start pulse generating circuit for generating a start pulse of prescribed duration at a start position of the Hi period of data;

a burst gate generating circuit for generating a burst gate signal at a middle position of the mark when the Hi period of data is long, and for not generating a burst gate signal when the Hi period of data is short;

an end pulse generating circuit for generating an end pulse of prescribed duration at an end position of the Hi period of data;

a mark/space length detection circuit for generating an nT mark signal in such a manner as to contain said start pulse and said end pulse when the Hi period of data is n clocks long, and for generating an mT space signal in such a manner as to contain said end pulse and said start pulse at both ends of the space when the Lo period of data is m clocks long (where n and m are natural numbers existing in data train);

an encoder for generating a select signal for controlling a start value selector and an end value selector (described hereinafter) from said nT mark signal and said mT space signal;

a cooling pulse generating circuit for generating a cooling pulse of prescribed duration from the end pulse output from said end pulse generating circuit;

a start value selector for selecting one value from among a plurality of start set values in accordance with said select signal, and for outputting the thus selected start set value;

a start value sample-and-hold circuit for updating the start set value supplied from said start value selector only when said start pulse has arrived, and for holding a previous value otherwise;

a start value programmable delay line for delaying said start pulse by varying an amount of delay in accordance with the start set value output from said start value sample-and-hold circuit, and for outputting the thus delayed start pulse;

an end value selector for selecting one value from among a plurality of end set values in accordance with said select signal, and for outputting the thus selected end set value;

an end value sample-and-hold circuit for updating the end set value supplied from said end value selector only when said end pulse has arrived, and for holding a previous value otherwise;

an end value programmable delay line for delaying said end pulse by varying an amount of delay in accordance with the end set value output from said end value sample-and-hold circuit, and for outputting the thus delayed end pulse;

a cooling pulse delay line for outputting a delayed cooling pulse by varying an amount of delay to be introduced in the cooling pulse output from said cooling pulse generating circuit;

an AND gate for ANDing said burst gate signal, output from said burst gate generating circuit, and clock, and thereby outputting a burst pulse;

an OR gate for ORing said delayed start pulse, said burst pulse, and said delayed end pulse, and thereby outputting a recording signal;

an inverter for inverting the delayed cooling pulse signal output from said cooling pulse delay line;

a bias current source for supplying a bias current to a laser diode hereinafter described;

a recording current source, connected in parallel with said bias current source, for supplying a recording current to the laser diode hereinafter described;

a read beam current source, connected in parallel with said bias current source, for supplying a read beam current to the laser diode hereinafter described;

a switch for turning on and off the current from said recording current source in accordance with said recording signal;

a switch for turning on and off the current from said bias current source in accordance with said cooling pulse signal; and a laser diode for recording a disk signal driven by said bias current source, said recording current source, and said read beam current source in parallel.

31. An optical information recording method by which a modulated signal is recorded, by switching laser light between a plurality of powers on an optical recording medium having a thin recording film that exhibits a reversible change between optically recognizable states, comprising the steps of:

modulating said laser light between at least three powers, including a recording power used for recording on said thin recording film, a bias power lower than said recording power, and a cooling power lower than said bias power, two successive recorded marks being separated by a space formed by radiation with said bias power, to form a recorded mark using a recording waveform having one pulse, and applying laser radiation with said bias power between laser radiation with said recording power and laser radiation with said cooling power.

32. An optical information recording method by which a modulated signal is recorded, by switching laser light between a plurality of powers on an optical recording medium having a thin recording film that exhibits a reversible change between optically recognizable states, comprising the steps of:

modulating said laser light between at least three powers, including a recording power used for recording on said thin recording film, a bias power lower than said recording power, and a cooling power lower than said bias power, two successive recorded marks being separated by a space formed by radiation with said bias power, to form a recorded mark using a recording waveform having one pulse, and applying laser radiation with said bias power between laser radiation with said recording power and laser radiation with said cooling power, wherein the start time of the laser radiation with said cooling power relative to the end of the laser radiation with said recording power is varied in accordance with a radius position on said optical recording medium.

33. An optical information recording method according to claim 32, wherein in an area of said optical recording medium at least inside a designated radius, the radiation with said cooling power is started earlier than in an area outside said designated radius.

34. An optical information recording method by which a modulated signal is recorded, by switching laser light between a plurality of powers on an optical recording medium having a thin recording film that exhibits a reversible change between optically recognizable states, comprising the steps of:

modulating said laser light between a preset first power having power equal to or higher than a recording power used for recording on said thin recording film, and a preset second power having power lower than said first power, to form a recorded mark using a recording pulse train, and applying a cooling pulse immediately after said recording pulse train, said cooling pulse having a cooling power lower than a bias power which is set lower than said recording power, wherein a period is provided during which said laser light power is varied incrementally or continuously from said cooling power, until said bias power is reached.

35. An optical information recording method by which a modulated signal is recorded, by switching laser light between a plurality of powers on an optical recording medium having a thin recording film that exhibits a reversible change between optically recognizable states, comprising the steps of:

modulating said laser light between a preset first power having power equal to or higher than a recording power used for recording on said thin recording film, and a preset second power having power lower than said first power, to form a recorded mark using a recording pulse train, and applying a cooling pulse immediately after said recording pulse train, said cooling pulse having a cooling power lower than a bias power which is set lower than said recording power, wherein said cooling pulse is formed as a train of plurality of pulses generated by switching said laser light alternately between said bias power and said cooling power.

36. An optical information recording method by which a modulated signal is recorded, by switching laser light between a plurality of powers on an optical recording medium having a thin recording film that exhibits a reversible change between optically recognizable states, comprising the steps of:

modulating said laser light between a preset first power having power equal to or higher than a recording power used for recording on said thin recording film, and a preset second power having power lower than said first power, to form a recorded mark using a recording pulse train, applying a cooling pulse after said recording pulse train, said cooling pulse having a cooling power lower than a bias power which is set lower than said recording power, and applying laser radiation with said bias power between said recording pulse train and said cooling pulse.

* * * * *